(12) United States Patent
Kiura

(10) Patent No.: US 9,813,612 B2
(45) Date of Patent: Nov. 7, 2017

(54) IMAGING APPARATUS, INFORMATION MANAGING APPARATUS, CONTROL METHODS THEREOF, AND NON-TRANSITORY COMPUTER-READABLE STORAGE MEDIUM FOR SUPERIMPOSING IMAGE DATA ON A DISPLAY

(71) Applicant: CANON KABUSHIKI KAISHA, Tokyo (JP)

(72) Inventor: Mikio Kiura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 198 days.

(21) Appl. No.: 14/560,412

(22) Filed: Dec. 4, 2014

(65) Prior Publication Data
US 2015/0181113 A1 Jun. 25, 2015

(30) Foreign Application Priority Data

Dec. 25, 2013 (JP) ................................. 2013-268087
Nov. 6, 2014 (JP) ................................. 2014-226403

(51) Int. Cl.
H04N 5/232 (2006.01)
H04N 5/272 (2006.01)

(52) U.S. Cl.
CPC ..... H04N 5/23222 (2013.01); H04N 5/23206 (2013.01); H04N 5/23293 (2013.01); H04N 5/272 (2013.01)

(58) Field of Classification Search
CPC ............... H04N 5/23222; H04N 5/272; H04N 5/23206; H04N 5/23293; H04N 1/00209; H04N 1/00114; H04N 1/00347
USPC ...................................... 348/207.1
See application file for complete search history.

(56) References Cited

U.S. PATENT DOCUMENTS

2011/0069196 A1* 3/2011 Jung ................... G06F 17/3028
348/222.1
2012/0268611 A1 10/2012 Kimijima et al.

FOREIGN PATENT DOCUMENTS

JP 2011-10133 A 1/2011
JP 2012-227814 A 11/2012

* cited by examiner

Primary Examiner — Lin Ye
Assistant Examiner — Chan Nguyen
(74) Attorney, Agent, or Firm — Fitzpatrick, Cella, Harper & Scinto

(57) ABSTRACT

An imaging apparatus acquires, from an external apparatus, other image data obtained by other imaging apparatuses and other image data information containing information about the other image data, superimposes the other image data information on an imaging confirmation screen, and displays the other image data information on a display unit.

16 Claims, 21 Drawing Sheets

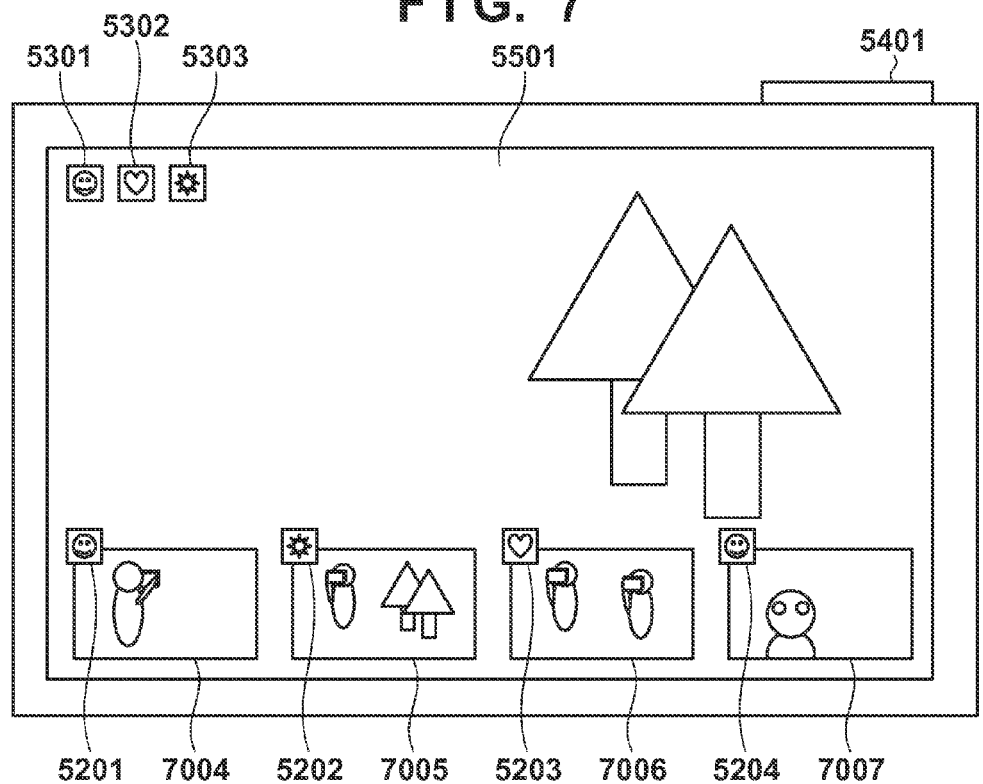
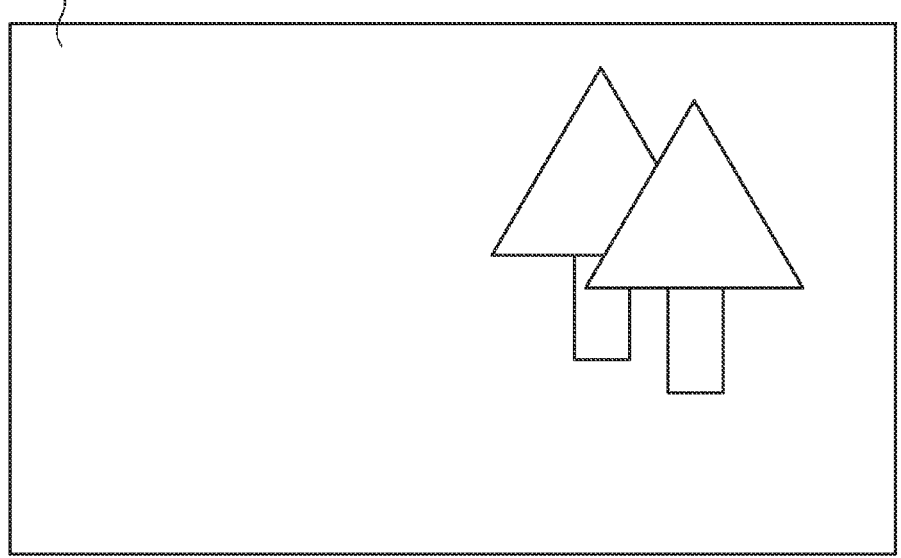

FIG. 9
| IMAGE DATA ID | USER ID | IMAGING TIME | GROUP ID | IMAGE DATA |
|---|---|---|---|---|
| 7001 | 4005 | 14:25:03 | 3 |  |
| 7002 | 4006 | 14:26:25 | 2 | 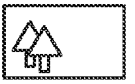 |
| 7003 | 4004 | 14:28:33 | 2 |  |
| 7004 | 4001 | 14:28:34 | 1 |  |
| 7005 | 4003 | 14:28:53 | 1 | 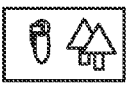 |
| 7006 | 4002 | 14:29:21 | 1 | 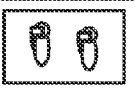 |
| 7007 | 4001 | 14:30:10 | 1 |  |
| 7008 | 4001 | 14:30:11 | 1 | 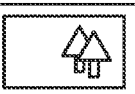 |
FIG. 10
| USER ID | ICON | GROUP ID |
|---|---|---|
| 4001 |  | 1 |
| 4002 |  | 1 |
| 4003 |  | 1 |
| 4004 |  | 2 |
| 4005 |  | 3 |
| 4006 |  | 2 |
| 4007 |  | 3 |

FIG. 18
| IMAGE DATA ID | USER ID | IMAGING TIME | IMAGE DATA | GROUP ID |
|---|---|---|---|---|
| 4001001 | 4001 | 14:28:34 |  | 1 |
| 4001002 | 4001 | 14:30:10 | 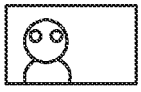 | 1 |
| 4001003 | 4001 | 14:30:11 |  | 1 |
FIG. 19
| IMAGE DATA ID | USER ID | IMAGING TIME | GROUP ID | IMAGE DATA |
|---|---|---|---|---|
| 4005003 | 4005 | 14:25:03 | 3 | 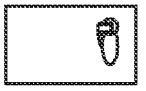 |
| 4006002 | 4006 | 14:26:25 | 2 |  |
| 4004004 | 4004 | 14:28:33 | 2 | 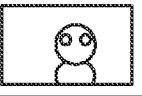 |
| 4001001 | 4001 | 14:28:34 | 1 | 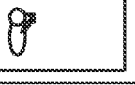 |
| 4003007 | 4003 | 14:28:53 | 1 |  |
| 4002004 | 4002 | 14:29:21 | 1 |  |
| 4001002 | 4001 | 14:30:10 | 1 |  |
| 4001003 | 4001 | 14:30:11 | 1 |  |

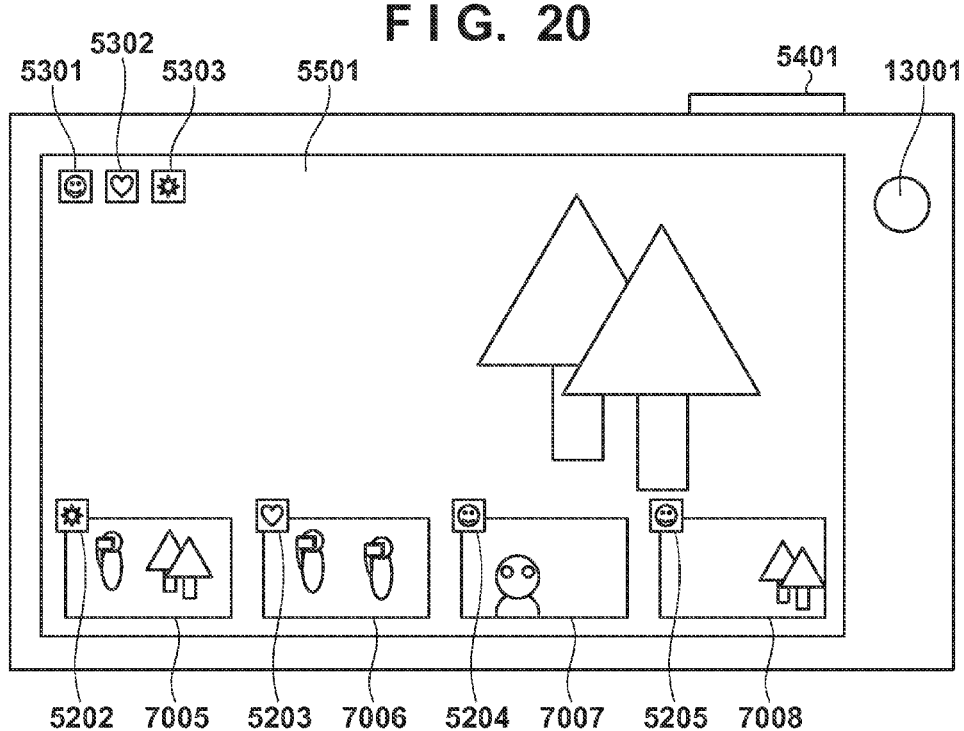
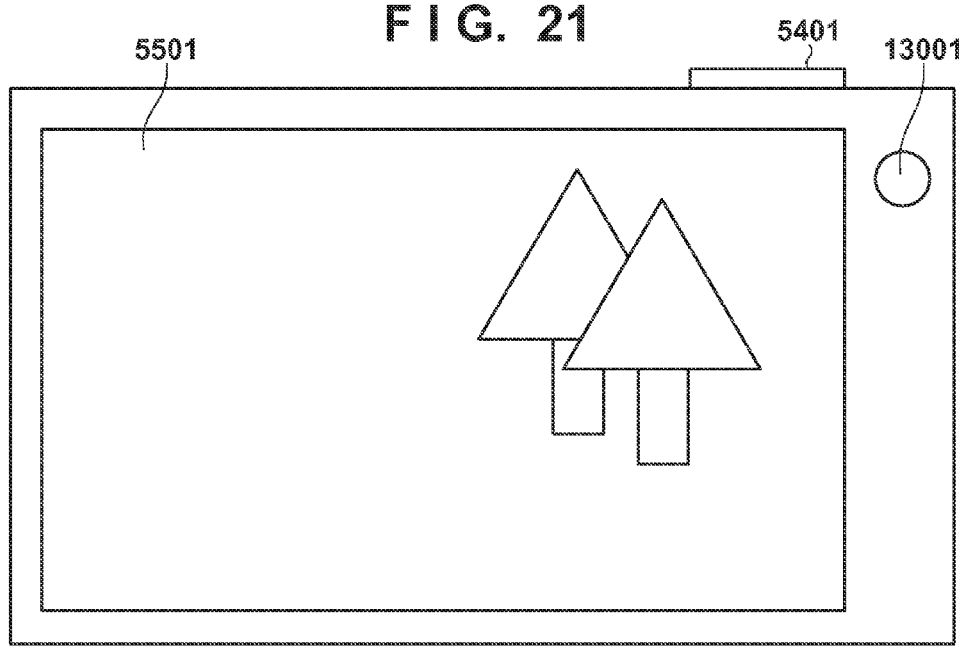

| USER ID | ICON | STATE | GROUP |
|---|---|---|---|
| 4001 | ☺ | PLAYBACK MODE | 1 |
| 4002 | ♡ | POWER OFF | 1 |
| 4003 | ✦ | RELEASE | 1 |
| 4004 | ◣ | DURING IMAGING | 2 |
| 4005 | ◯ | DURING IMAGING | 3 |
| 4006 | ✚ | RELEASE | 2 |
| 4007 | ◆ | POWER OFF | 3 |

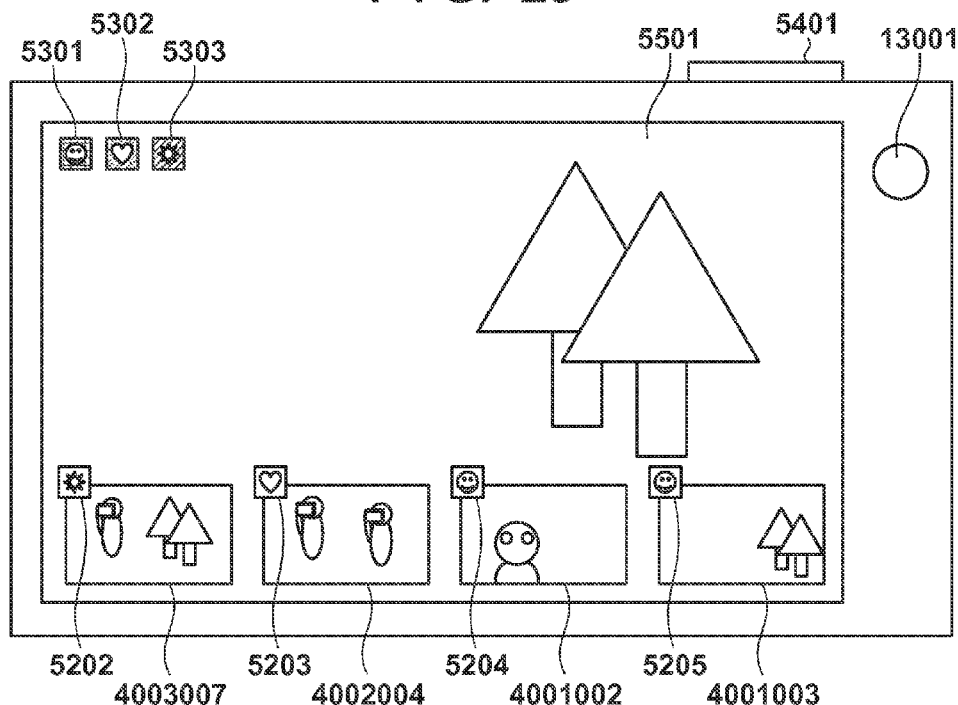

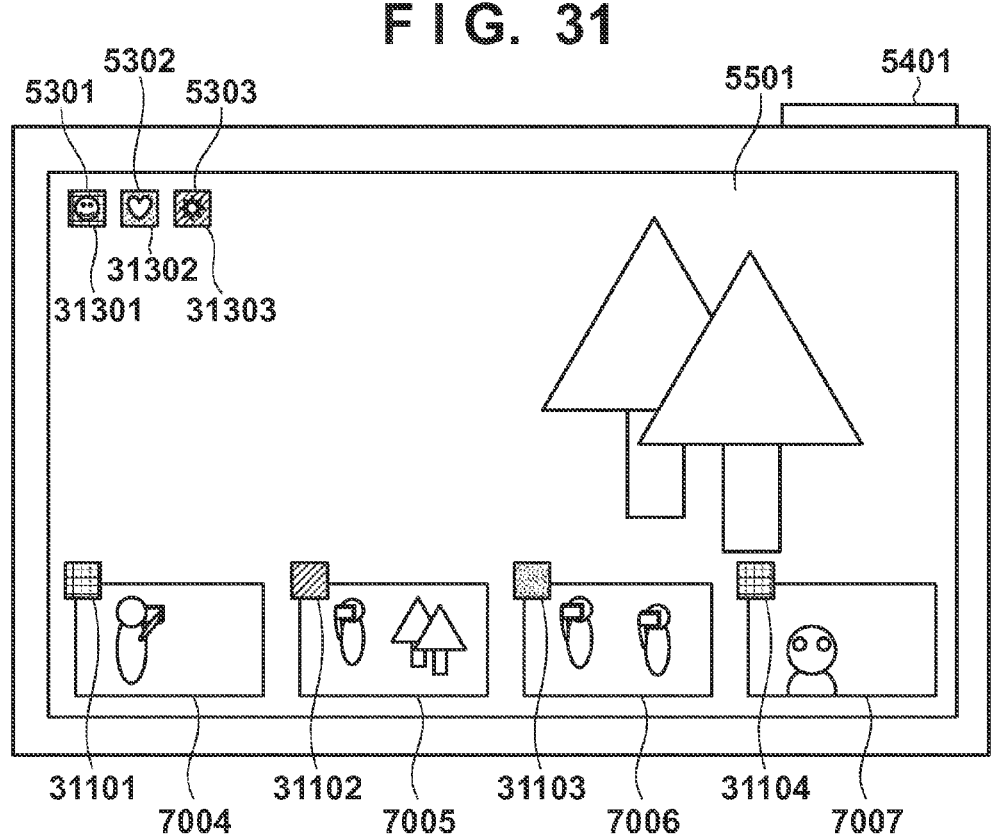

IMAGING APPARATUS, INFORMATION MANAGING APPARATUS, CONTROL METHODS THEREOF, AND NON-TRANSITORY COMPUTER-READABLE STORAGE MEDIUM FOR SUPERIMPOSING IMAGE DATA ON A DISPLAY

BACKGROUND OF THE INVENTION

Field of the Invention

The present invention relates to an imaging apparatus and an information managing apparatus that support imaging actions by respective users belonging to one imaging group, control methods thereof, and a non-transitory computer-readable storage medium.

Description of the Related Art

When a plurality of participants of a group enjoy a travel or an event, they often take photographs by using their own imaging apparatuses. However, the participants sometimes take similar photographs unintentionally. In this case, even if they bring together the captured photographs and try to create an album later, these photographs resemble each other and are monotonous. To avoid this, there is proposed a method for easily grasping photographs taken by respective members of a group during imaging by them.

For example, in Japanese Patent Laid-Open No. 2012-227814, photographs taken by respective users constituting a group are immediately transferred to the cameras of the other users via a network so that the users can confirm photographs taken by the other users constituting the group. Another conventional method of confirming photographs taken by a user in the past is a method of presenting photographs taken in the past by the user on a view finder screen during imaging so that the user can easily confirm the photographs taken in the past.

In the method disclosed in Japanese Patent Laid-Open No. 2012-227814, photographs taken by other users constituting a group can be confirmed by a simple operation. However, the view finder screen during imaging differs from the playback screen of photographs by other users, so a user cannot view, during imaging, photographs taken by other users constituting a group. This indicates that the user needs to intentionally switch between the view finder screen and the playback screen, and the imaging action of the user is interrupted. When an object moves, it is difficult to merely switch to the playback screen. As an example in which an object moves, imaging during sports watching or imaging of an animal will be considered. At this time, a user cannot predict the timing of a photo opportunity at high precision because the object moves. When the user images such a moving object, he may want to always confirm the view finder screen and keep an imageable state in order to take a better photograph. In this case, however, the user cannot confirm photographs taken by other users.

By the other conventional method, a user cannot confirm photographs taken by other users constituting a group. The user can grasp his imaging trend from photographs taken by him in the past, but cannot confirm the imaging trend of the group. Thus, when photographs are shared later in the group, users constituting the group may have taken similar photographs.

SUMMARY OF THE INVENTION

The present invention has been made to solve the above problems, and provides a method of efficiently performing imaging while confirming data obtained by a plurality of users belonging to the same imaging group.

According to one aspect of the present inventions, there is provided an imaging apparatus comprising: an acquiring unit configured to acquire, from an external apparatus, other image data obtained by other imaging apparatuses, and other image data information containing information about the other image data; and a display control unit configured to superimpose the other image data information acquired by the acquiring unit on an imaging confirmation screen and display the other image data information on a display unit.

Further features of the present invention will become apparent from the following description of exemplary embodiments (with reference to the attached drawings).

BRIEF DESCRIPTION OF THE DRAWINGS

FIG. 7 is a view showing an example of a display on the rear surface of a camera 2100 in the first embodiment;

FIG. 8 is a view showing an example of image data in the first embodiment;

FIG. 9 is a table showing an example of information stored in an image data storage unit A16020 in the first embodiment;

FIG. 10 is a table showing an example of information stored in a user information storage unit A16010 in the first embodiment;

FIG. 18 is a table showing an example of information stored in an image data storage unit A15010 in the second embodiment;

FIG. 19 is a table showing an example of information stored in an image data storage unit A16020 in the second embodiment;

FIG. 20 is a view showing an example of a screen presented on an information presenting apparatus A14000 when the switch of a presentation information control apparatus A17000 is ON in the second embodiment;

FIG. 21 is a view showing an example of a screen presented on the information presenting apparatus A14000 when the switch of the presentation information control apparatus A17000 is OFF in the second embodiment;

FIG. 29 is a view showing an example of a display on the rear surface of a camera 11100 in the third embodiment;

FIG. 30 is a table showing an example of the correspondence between the state of the imaging apparatus and a filter in the third embodiment;

FIG. 31 is a view showing an example of a display on the rear surface of a camera 2100 in the fourth embodiment;

FIG. 32 is a table showing an example of the correspondence between a user ID and a texture in the fourth embodiment;

DESCRIPTION OF THE EMBODIMENTS

First Embodiment

The first embodiment of the present invention will now be described with reference to the accompanying drawings.

(Overall Arrangement View and Function)

Figure 1:
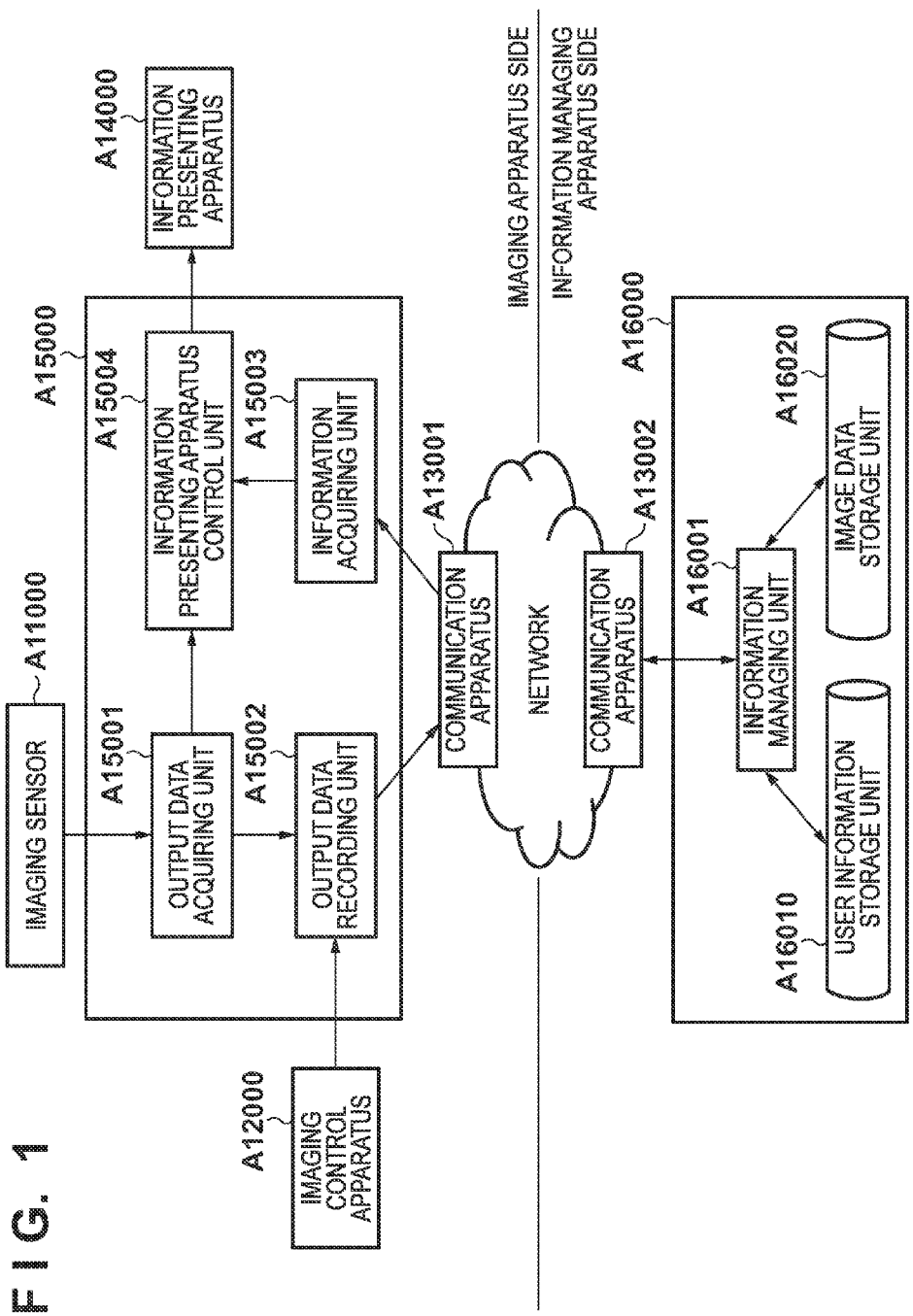
FIG. 1 is a view showing the overall arrangement and function of an imaging apparatus according to the first embodiment.

FIG. 1 is a view showing the overall arrangement and function of an imaging apparatus according to this embodiment. An imaging sensor A11000 is, for example, a CMOS image sensor. The imaging sensor A11000 converts light incoming from an external element such as a lens into an electrical signal processable by a first calculating unit A15000, and outputs the electrical signal to the first calculating unit A15000. The output from the imaging sensor A11000 is used to record image data in the first calculating unit A15000 and display a live view image (output from the imaging sensor A11000) as a live view on an information presenting apparatus A14000. A live view image is a real-time image output from an imaging sensor. A live view image is an image that is not recorded after imaging in a recording medium, e.g., a memory card. A user can determine a composition of an object when imaging still images by visibly recognizing this live view image. An imaging control apparatus A12000 is, for example, a button attached to the imaging apparatus. When a user presses this button at an arbitrary timing, the first calculating unit A15000 records an output from the imaging sensor A11000 as image data in an output data recording unit A15002, and transmits the image data to the outside via a communication apparatus A13001.

Each of the communication apparatus A13001 and a communication apparatus A13002 is formed from, for example, a wireless LAN communication module, a wireless LAN router, and a communication line. The communication apparatuses A13001 and A13002 perform communication to share image data obtained by the imaging apparatus with other users constituting a group. The information presenting apparatus A14000 is, for example, a view finder. The information presenting apparatus A14000 presents, to the user, a live view image acquired from the imaging sensor A11000, and various kinds of information acquired from the outside by the communication apparatus A13001.

The first calculating unit A15000 performs various calculations regarding acquisition of image data and presentation of information. A second calculating unit A16000 performs various calculations regarding user information and image data. The arrangements of the first calculating unit A15000 and second calculating unit A16000 will be described below. An output data acquiring unit A15001 acquires an output from the imaging sensor A11000, and outputs the acquired data to the output data recording unit A15002 or an information presenting apparatus control unit A15004 in response to a request. The output data recording unit A15002 records an output from the output data acquiring unit A15001 as image data in accordance with an instruction from the imaging control apparatus A12000. The recorded image data is output to an information managing unit A16001 via the communication apparatuses A13001 and A13002, and stored in a user information storage unit A16010 and an image data storage unit A16020.

An information acquiring unit A15003 acquires, via the communication apparatus A13001, information about a user that is stored in the user information storage unit A16010, and information about image data that is stored in the image data storage unit A16020. The information presenting apparatus control unit A15004 acquires, from the output data acquiring unit A15001, a live view image (live view) output from the imaging sensor A11000. Then, the information presenting apparatus control unit A15004 superimposes, on the live view image, information of users belonging to the same group that are acquired from the information acquiring unit A15003, and information about image data obtained by the users. The information presenting apparatus control unit A15004 outputs the resultant information to the information presenting apparatus A14000.

The information managing unit A16001 stores information received from the output data recording unit A15002 via the communication apparatus A13002 by using the user information storage unit A16010 and the image data storage unit A16020, and performs centralized management of the information. In response to a request from the information acquiring unit A15003, the information managing unit A16001 outputs the stored information to the information acquiring unit A15003 via the communication apparatus A13002. The user information storage unit A16010 stores information such as icons representing users and a group to which these users belong, and outputs the stored information to the information managing unit A16001 in response to a request from the information managing unit A16001. The image data storage unit A16020 stores image data obtained by a user, and outputs the stored information to the information managing unit A16001 in response to a request from the information managing unit A16001.

(Practical Arrangement)

Figure 2:
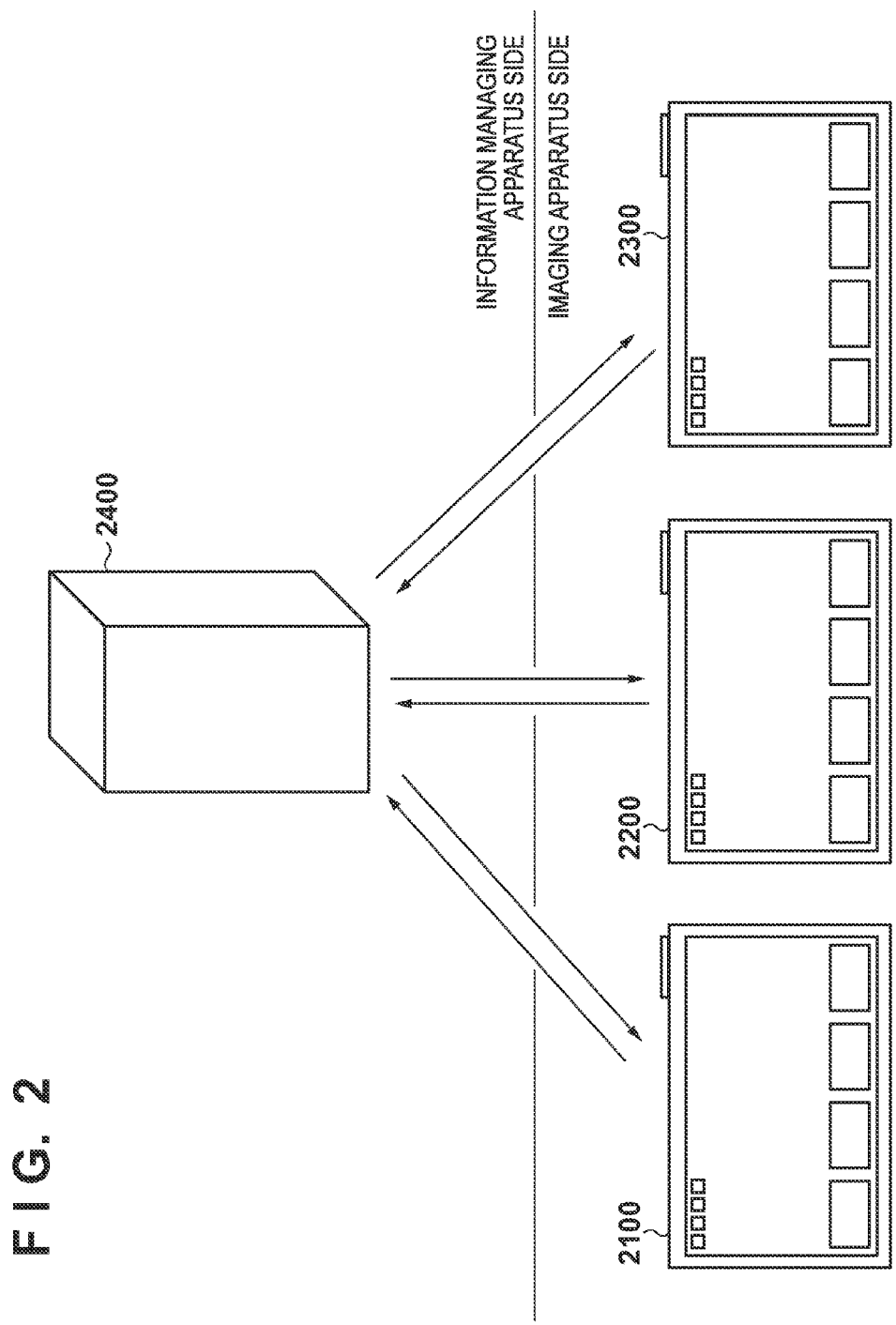
FIG. 2 is a view showing a practical arrangement in the first embodiment.

FIG. 2 shows a practical arrangement in the first embodiment. Each of cameras (imaging apparatuses) 2100 to 2300 includes the imaging sensor A11000, the imaging control apparatus A12000, the communication apparatus A13001, the information presenting apparatus A14000, and the first calculating unit A15000 shown in FIG. 1. An information managing apparatus 2400 includes the communication apparatus A13002 and the second calculating unit A16000 shown in FIG. 1.

When a user presses a button equivalent to the imaging control apparatus A12000 in each of the cameras 2100 to 2300, the output data acquiring unit A15001 acquires an output from a CMOS image sensor equivalent to the imaging sensor A11000. The output data acquiring unit A15001 records the acquired data as image data in the output data recording unit A15002. The output data recording unit A15002 sends the image data to the information managing apparatus 2400 via a wireless LAN communication module, a wireless LAN router, and communication equipment such as an Internet line that are equivalent to the communication apparatus A13001. The information presenting apparatus A14000 superimposes and displays information (image data information) acquired from the information managing apparatus 2400 on a live view image acquired from the imaging sensor A11000.

The first calculating unit A15000 has a program for executing the functions of the output data acquiring unit A15001, output data recording unit A15002, information acquiring unit A15003, and information presenting apparatus control unit A15004. The second calculating unit A16000 has a program for executing the function of the information managing unit A16001, and includes a storage device usable as the user information storage unit A16010 and the image data storage unit A16020. The practical arrangement in this embodiment has been described.

(Practical Processing Example)

Figure 6:
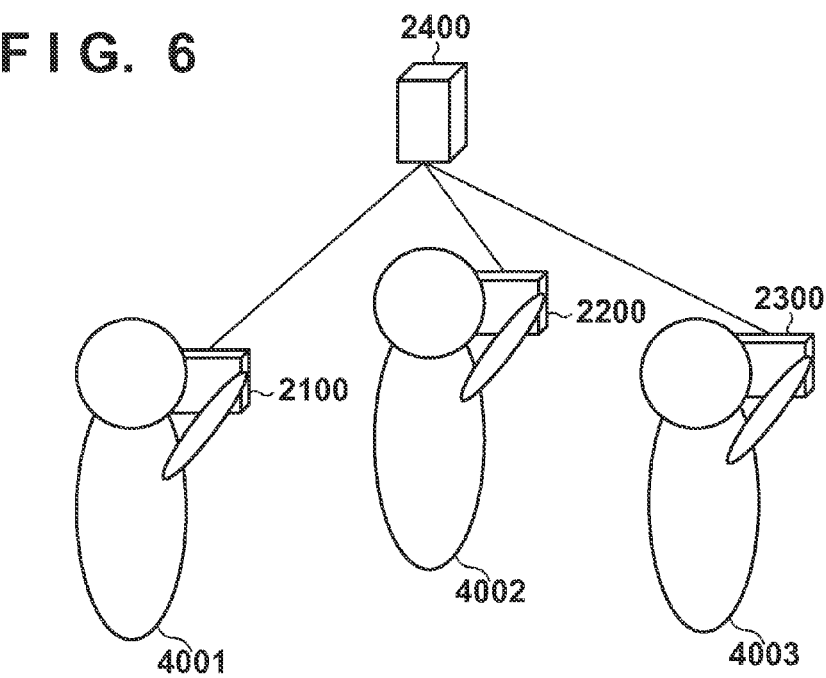
FIG. 6 is a view showing a use scene assumed in the first embodiment.

A practical processing example in this embodiment will be explained below with reference to the accompanying drawings. FIG. 6 shows a use scene assumed in this embodiment. This embodiment assumes that users 4001, 4002, and 4003 perform imaging with the predetermined hand-held cameras 2100, 2200, and 2300, respectively, as shown in FIG. 6. Each of the cameras 2100 to 2300 transmits image data obtained by the user and the like to the information managing apparatus 2400, and receives image data obtained by users constituting a group, and the like from the information managing apparatus 2400. Assume that the users 4001 to 4003 belong to the same imaging group, and this group has already been set in advance in the user information storage unit A16010 of the information managing apparatus 2400.

FIG. 7 shows a state of the camera 2100 of the user 4001 in this embodiment when viewed from the rear surface (view finder). A button 5401 is equivalent to the imaging control apparatus A12000 in FIG. 1. A view finder screen 5501 is equivalent to the display unit of the information presenting apparatus A14000 in FIG. 1. The information presenting apparatus control unit A15004 of the camera 2100 displays a live view image acquired by the output data acquiring unit A15001 on the view finder screen 5501. The information presenting apparatus control unit A15004 displays the icons (icons 5301 to 5303) of the other users constituting the group while a live view image is displayed on the view finder screen 5501. From this display, the user 4001 can easily confirm users with whom obtained image data will be shared. The information presenting apparatus control unit A15004 displays, on the view finder screen 5501 in time series, image data 7004 to 7007 obtained by the other users. From this display, the user 4001 can easily confirm the images obtained by the other users constituting the group. Further, the information presenting apparatus control unit A15004 superimposes and displays icons 5201, 5202, 5203, and 5204 of the users on the image data 7004, 7005, 7006, and 7007, respectively. From this display, the user 4001 can easily confirm users who have obtained the respective image data. Although the image data 7004 to 7007 shown in FIG. 7 are data obtained by reducing actual image data, the size of image data displayed in this embodiment is not particularly limited.

Figure 3:
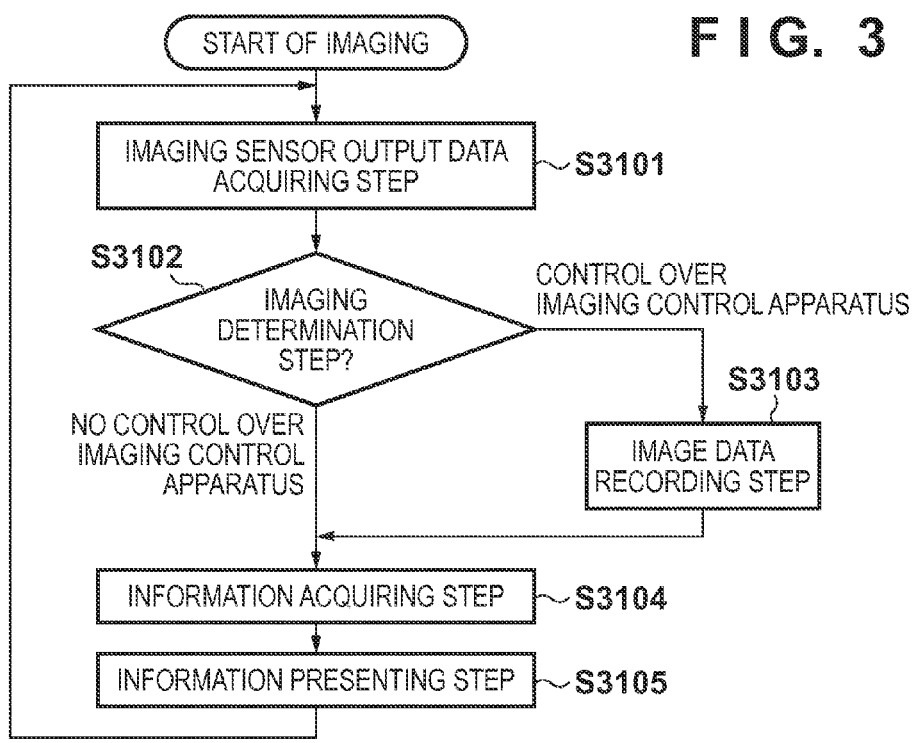
FIG. 3 is a flowchart showing the processing sequence of the imaging apparatus in the first embodiment.
Figure 4:
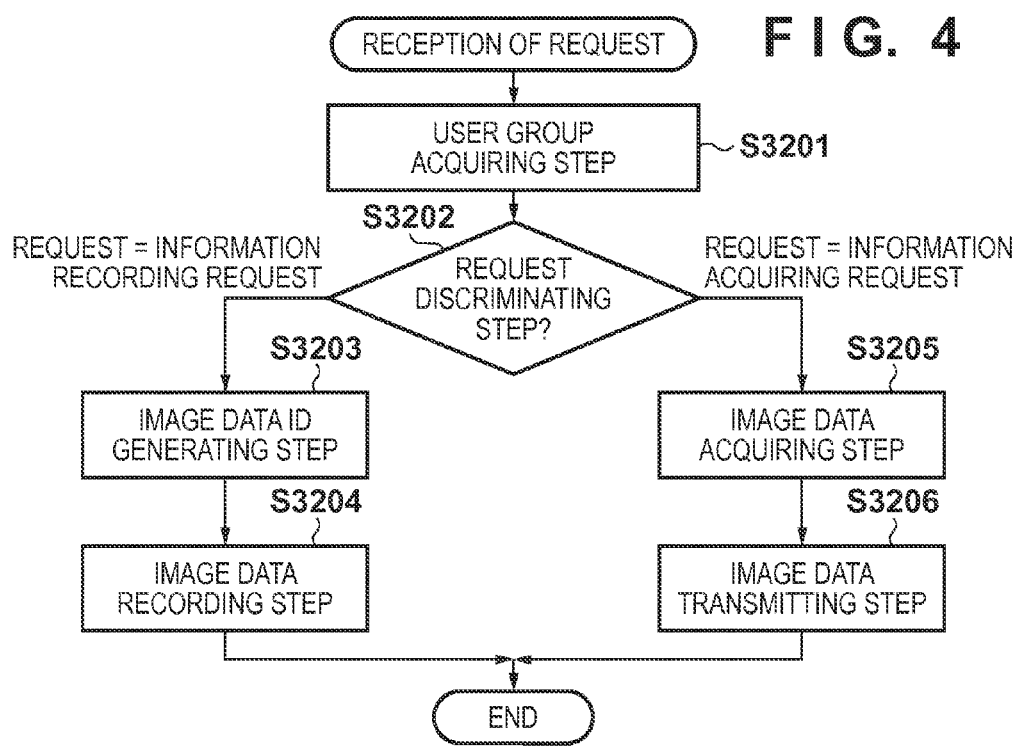
FIG. 4 is a flowchart showing the processing sequence of an information managing apparatus in the first embodiment.

Next, the processing sequences of the camera (imaging apparatus) 2100 and information managing apparatus 2400 when the user 4001 performs imaging by using the camera 2100 will be explained with reference to FIGS. 3 and 4. FIG. 3 is a flowchart showing the processing sequence of the camera 2100. FIG. 4 is a flowchart showing the processing sequence of the information managing apparatus 2400. In imaging sensor output data acquiring step S3101 of FIG. 3, the output data acquiring unit A15001 acquires output data of the CMOS image sensor serving as the imaging sensor A11000. The output data acquiring unit A15001 outputs output data in response to requests from the output data recording unit A15002 and the information presenting apparatus control unit A15004.

Note that the CMOS image sensor is used as the imaging sensor A11000 in this embodiment, but another type of image sensor such as a CCD may be used. The camera 2100 serving as an imaging apparatus includes the single imaging sensor A11000 in this embodiment. Alternatively, the camera 2100 may include a plurality of imaging sensors, and a proper imaging sensor may be selected by any method. When acquiring output data from the imaging sensor A11000, the output data acquiring unit A15001 may perform settings of the data size, frame rate, and the like. Imaging timings need not be equal intervals such as 30 frames per sec. Instead, when the movement of an object is detected by using a moving object detection function or the like, the output data acquiring unit A15001 may acquire an output from the imaging sensor A11000. The method of acquiring an output from the imaging sensor A11000 by the output data acquiring unit A15001 is not limited to a method of acquiring an output from the imaging sensor A11000 directly via a wire, but the output may be acquired via a network by using Bluetooth® or a wireless LAN. As the acquisition method, data may be acquired from the imaging sensor A11000 by an NTSC video signal or the like, or may be acquired in the format of a Bitmap image or the like. Needless to say, the image data acquisition method and format are not limited.

In imaging determination step S3102, the output data recording unit A15002 determines whether the button 5401 of the camera 2100 equivalent to the imaging control apparatus A12000 has been pressed. In this embodiment, the physical button is used as the imaging control apparatus A12000. However, the button may be replaced with a touch panel, any gesture, a timer, a combination of them, or the like as long as the imaging timing and the imaging condition can be designated. The presence/absence of pressing may be determined during the cycle of the sequence shown in FIG. 3. Alternatively, the output data recording unit A15002 may query for a determination result at regular intervals such as in polling, or by interruption. The imaging control apparatus A12000 need not always be integrated with the camera 2100, and an imaging instruction may be issued via a network.

Figure 5:
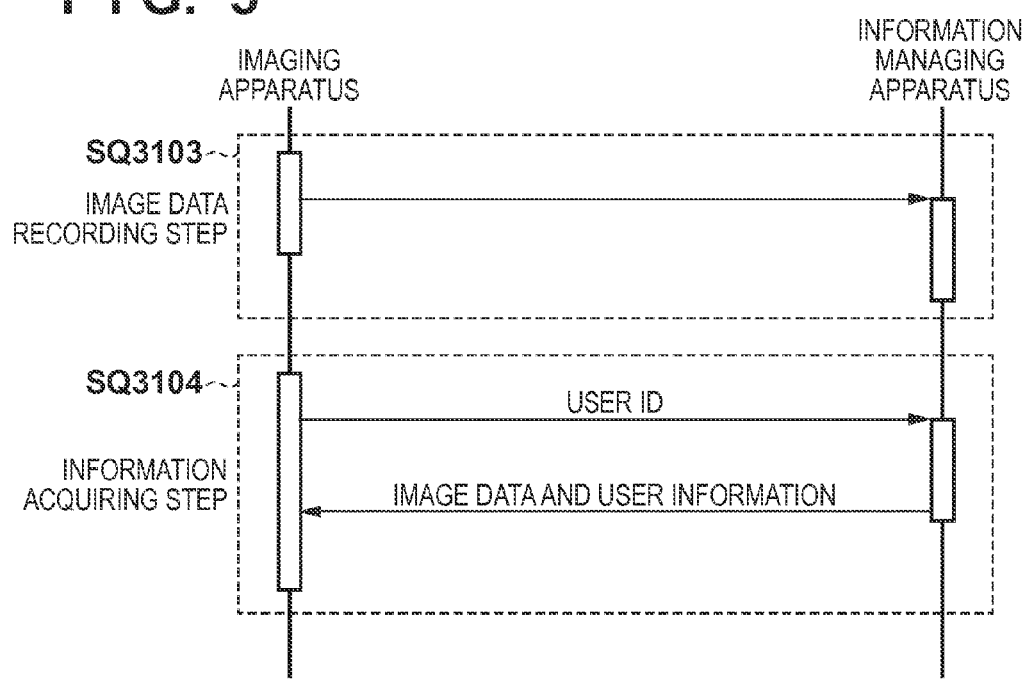
FIG. 5 is a chart showing a communication sequence in the first embodiment.

If it is determined in imaging determination step S3102 that the button 5401 of the camera 2100 has been pressed, the process advances to image data recording step S3103. FIG. 5 shows a communication sequence in this embodiment. The communication sequence in image data recording step S3103 is shown in SQ3103 of FIG. 5. In image data recording step S3103, the output data recording unit A15002 records, as image data of a JPEG image, an output from the imaging sensor A11000 that has been output from the output data acquiring unit A15001. The output data recording unit A15002 transmits a request containing the recorded image data to the information managing apparatus 2400 by using the communication apparatus A13001. Note that the output data recording unit A15002 may generate reduced image data by reducing image data, and transmit the reduced image data.

FIG. 8 shows an example of image data 6000 recorded as a JPEG image by the output data recording unit A15002. When transmitting image data to the information managing apparatus 2400, the output data recording unit A15002 adds an ID (identification information) "4001" of the user 4001 and the imaging time to the image data. Note that information added to image data is not limited to the user ID and the imaging time. Also, the user ID added to image data may be replaced with another. For example, an imaging apparatus-specific ID may be sent as long as an imaging apparatus and the user of the imaging apparatus can be linked and identified by any method. Further, image data need not be a JPEG image, and may be Bitmap or RAW data. Data to be transmitted together with image data is not limited to the user ID. For example, GPS information of an imaging location, or information about an imaging apparatus such as the shutter speed or ISO sensitivity may be sent. Information to be sent to the information managing apparatus 2400 is not limited.

Since this embodiment assumes the network configuration as shown in FIG. 2, each of the cameras 2100 to 2300 sends image data, the user ID, and the imaging time to the information managing apparatus 2400. However, the information managing apparatus 2400 need not always perform centralized management of information. The cameras may communicate with each other and function as information managing apparatuses for the other cameras, or one of the cameras may function as both the camera and the information managing apparatus. As a communication means to the information managing apparatus 2400, the imaging apparatus may be directly connected to a public line such as 3G or LTE, or connected to the Internet by using a mobile Wi-Fi router. The information managing apparatus 2400 need not always reside on the Internet. Instead, the information managing apparatus 2400 may be built in a local area network so that it can be accessed by using a wireless LAN or the like. At this time, the location of the information managing apparatus 2400 and the access means to the information managing apparatus 2400 are not limited to a specific position and method. As a matter of course, the type of network connection means such as wireless or wired connection is not limited. In this way, the request containing image data is transmitted to the information managing apparatus 2400 in image data recording step S3103.

When the information managing unit A16001 of the information managing apparatus 2400 receives, via the communication apparatus A13002, the request containing the image data 6000, and the user ID ("4001" in this embodiment) of the user 4001 and the imaging time that are added to the image data 6000, the information managing apparatus 2400 executes processing complying with the processing sequence shown in FIG. 4.

In user group acquiring step S3201 of FIG. 4, the information managing unit A16001 acquires a user group ID corresponding to the received user ID by referring to the user information storage unit A16010. FIG. 10 shows an example of user information stored in the user information storage unit A16010. The table in FIG. 10 includes the user ID, the ID of a group to which the user belongs, and the icon of the user. However, the user information storage unit A16010 may store other information about the user, for example, the creation time of user information, the edit time of data, a password for user authentication, and information capable of identifying the user such as a terminal-specific ID. In the table shown in FIG. 10, the group ID of the user 4001 is "1".

In request discriminating step S3202, the information managing unit A16001 discriminates whether the request received from the camera 2100 is an information recording request or an information acquiring request. In this embodiment, the information managing unit A16001 determines that the request is an information recording request if image data is contained as the argument of the request, and that the request is an information acquiring request if no image data is contained. However, the discrimination may be made by using other information such as the value of an argument indicating a request, the protocol of the request, or the timing of the request.

As described above, the request received by the information managing unit A16001 from the imaging apparatus 2100 is an information recording request containing image data, so the process advances to image data ID generating step S3203. In image data ID generating step S3203, the image data storage unit A16020 generates a unique ID and adds it to the image data. In this embodiment, the image data storage unit A16020 adds, for example, a unique image data ID "7008" to the image data 6000 shown in FIG. 8 (see FIG. 9 to be described later). In this embodiment, the image data storage unit A16020 generates and adds image data IDs in the order in which the information managing unit A16001 has received image data. However, the image data ID generation means is arbitrary, and the hash of image data or another image data ID capable of identifying image data is available. The format of the image data ID is not limited to a numeral. It is also possible to assign an image data ID to each user ID and handle them as a composite key.

In image data recording step S3204, the image data storage unit A16020 records the image data ID together with the user ID "4001", the group ID, the image data, and the imaging time in the image data storage unit A16020. FIG. 9 shows an example of information recorded in the image data storage unit A16020. Note that information recorded in the image data storage unit A16020 is not limited to one shown in FIG. 9, and other information about imaging may be recorded. The image data storage unit A16020 may record information such as the user and the imaging date & time in different tables. The design of the table for storing information is not particularly limited. Further, the image data storage unit A16020 manages information by using the table in this embodiment, but another description format such as text data, JSON, or CSV is available as long as information can be managed.

Referring back to FIG. 3, if it is determined in imaging determination step S3102 that the button 5401 of the camera 2100 has not been pressed, the process advances to information acquiring step S3104. Note that the communication sequence in information acquiring step S3104 is shown in SQ3104 of FIG. 5. In information acquiring step S3104, the information acquiring unit A15003 makes a query (information acquiring request) to the information managing unit A16001 via the communication apparatus A13001. This query contains an instruction for acquiring information about users belonging to the same group as that of the user 4001 designated by the information acquiring unit A15003. After the information managing unit A16001 receives this query, the information managing apparatus 2400 performs processing complying with the processing sequence shown in FIG. 4.

In FIG. 4, user group acquiring step S3201 and request discriminating step S3202 have been described above. Since the information managing unit A16001 has received the information acquiring request from the imaging apparatus 2100 in request discriminating step S3202, the process advances to image data acquiring step S3205.

In image data acquiring step S3205, the information managing unit A16001 refers to the user information storage unit A16010 and the image data storage unit A16020, and acquires information (image data information) about image data by the users belonging to the same group as that of the user 4001 designated by the information acquiring unit A15003. In this embodiment, the information managing unit A16001 acquires, from the image data storage unit A16020, the image data ID, user ID, imaging time, and image data that are information about image data obtained by the users 4001 to 4003 belonging to the same group as that of the user 4001. In an example of information stored in the image data storage unit A16020 shown in FIG. 9, the image data obtained by the users 4001 to 4003 are image data 7004 to 7008. The information managing unit A16001 acquires information about the users belonging to the same group as that of the user 4001 from the user information storage unit A16010. In this embodiment, the information managing unit A16001 acquires, from the image data storage unit A16020, the user IDs and the icons of the users that are information about the users 4001 to 4003 belonging to the same group as that of the user 4001.

In image data transmitting step S3206, the information managing unit A16001 transmits the information acquired in step S3205 to the information acquiring unit A15003 via the communication apparatus A13002. That is, the information to be transmitted include information about the users 4001 to 4003 and information about the image data 7004 to 7008. In this embodiment, all target image data are transmitted when the information managing unit A16001 receives a query (information acquiring request) from the information acquiring unit A15003. However, the information managing unit A16001 may employ a method of acquiring only a list of image data from the image data storage unit A16020 and if necessary, transferring image data itself. Alternatively, the information managing unit A16001 may perform pagerization to transfer only a predetermined number of image data, as a matter of course. The information acquiring unit A15003 executes a query (information acquiring request) in the processing sequence shown in FIG. 3 in this embodiment, but need not always be executed in this sequence. The information acquiring unit A15003 may execute a query at regular intervals (for example, 1 sec) such as in polling, or may execute a query upon generation of any event.

Referring back to FIG. 3, in information presenting step S3105, the information presenting apparatus control unit A15004 performs control of presenting a live view image acquired by the output data acquiring unit A15001 on the information presenting apparatus A14000. Further, the information presenting apparatus control unit A15004 performs control of sorting information about the users 4001 to 4003 that have been acquired by the information acquiring unit A15003, image data by these users, and information about the image data, associating them, and presenting them on the information presenting apparatus A14000. Note that image data presented on the information presenting apparatus A14000 by the information presenting apparatus control unit A15004 may be reduced image data obtained by reducing actual image data. The reduced image data may be generated by the output data recording unit A15002, the information acquiring unit A15003, or the information presenting apparatus control unit A15004.

Figure 11:
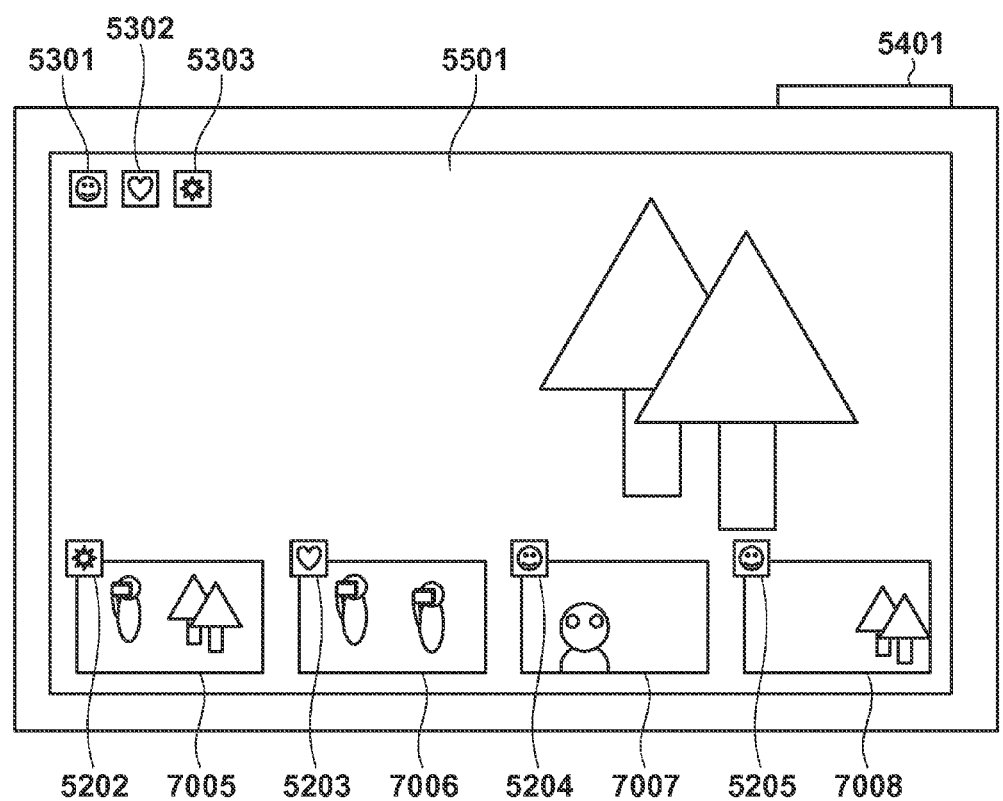
FIG. 11 is a view showing an example of a screen presented on an information presenting apparatus A14000 in the first embodiment.

FIG. 11 shows an example of a display presented on the display unit (view finder screen 5501) of the information presenting apparatus A14000 by display control of the information presenting apparatus control unit A15004. As shown in FIG. 11, the information presenting apparatus control unit A15004 displays the icons 5301 to 5303, which are information about the users 4001 to 4003 constituting the group, at the upper left corner of the view finder screen 5501 (imaging confirmation screen) on which a live view image is displayed. While the user 4001 performs imaging, the users 4001 to 4003 of the group to which the user 4001 belongs can view image data. The information presenting apparatus control unit A15004 superimposes and displays, at the bottom of the view finder screen 5501, the image data 7005 to 7008 obtained by the users 4001 to 4003.

Here, the view finder screen 5501 before imaging by the user 4001 shown in FIG. 7, and the view finder screen 5501 after imaging by the user 4001 shown in FIG. 11, will be compared. In FIG. 11, the image data 7004 is not displayed on the view finder screen 5501, the image data 7005 to 7007 shift leftward, and the image data 7008 is newly displayed at the right end. This is because the user 4001 has newly obtained the image data 7008 in image data recording step S3103. The newly obtained image data 7008 is displayed at the right end of the screen. This also represents that the ascending order of the imaging date & time is the order of the image data 7005, 7006, 7007, and 7008. Further, icons 5202 to 5205 of the users are displayed at the upper left corners of the respective image data 7005 to 7008, respectively. These icon displays indicate that, for example, the user 4003 obtained the image data 7005, the user 4002 obtained the image data 7006, and user 4001 obtained the image data 7007 and 7008.

In this fashion, according to this embodiment, information of users constituting a group, and image data of the users constituting the group are superimposed and displayed on the view finder screen 5501 on which a live view image is displayed. During an imaging action, each user can easily confirm the contents of photographs being taken by the other users. Although information are presented in the layout as shown in FIG. 11, these information are not always limited to this layout. The information presenting apparatus control unit A15004 may perform control of dividing the display region and displaying information on the information presenting apparatus A14000 as long as the user can easily confirm the information during imaging. Information of the user himself and image data obtained by the user himself need not always be displayed.

As described above, the imaging apparatus according to this embodiment transmits obtained image data to the information managing apparatus, and acquires image data obtained by other users constituting a group, and information about the other users constituting the group. The imaging apparatus superimposes and displays the acquired information on the view finder screen of the imaging apparatus. Each user can easily grasp the contents of photographs being taken in the group. Therefore, photographs beneficial to users, objects, and persons concerned can be taken efficiently.

According to this embodiment, images obtained by other users are presented to the user of an imaging apparatus on the view finder screen on which a live view image is displayed. Photographs appreciated by objects, users, and persons concerned can be taken efficiently. Note that the imaging apparatus in this embodiment is a hand-held camera, but the type of imaging apparatus to which this embodiment is applied is not limited. That is, the imaging apparatus to which this embodiment is applied may be a smartphone application. The view finder (information presenting apparatus A14000) and the imaging sensor (imaging sensor A11000) may be physically separated, as in a camera that performs remote control. The camera size, shape, method, and the like are not particularly limited. Needless to say, objects, scenes, and the like are not particularly limited.

Second Embodiment

The second embodiment of the present invention will be described below with reference to the accompanying drawings. The second embodiment is different from the first embodiment mainly in that an imaging apparatus according to the second embodiment transmits image data to an external apparatus at the time of imaging and at the same time, records the image data in the internal memory of the imaging apparatus. When presenting information on an information presenting apparatus, the imaging apparatus according to the second embodiment acquires an image obtained by the user of the imaging apparatus from the internal memory of the imaging apparatus, and acquires images obtained by other users from a network. The second embodiment is different from the first embodiment in the following points. That is, one of imaging apparatuses used by users constituting a group is used as both the imaging apparatus and the information managing apparatus. Also, information to be presented to the user by the information presenting apparatus is changeable.

(Overall Arrangement View and Function)

Figure 12:
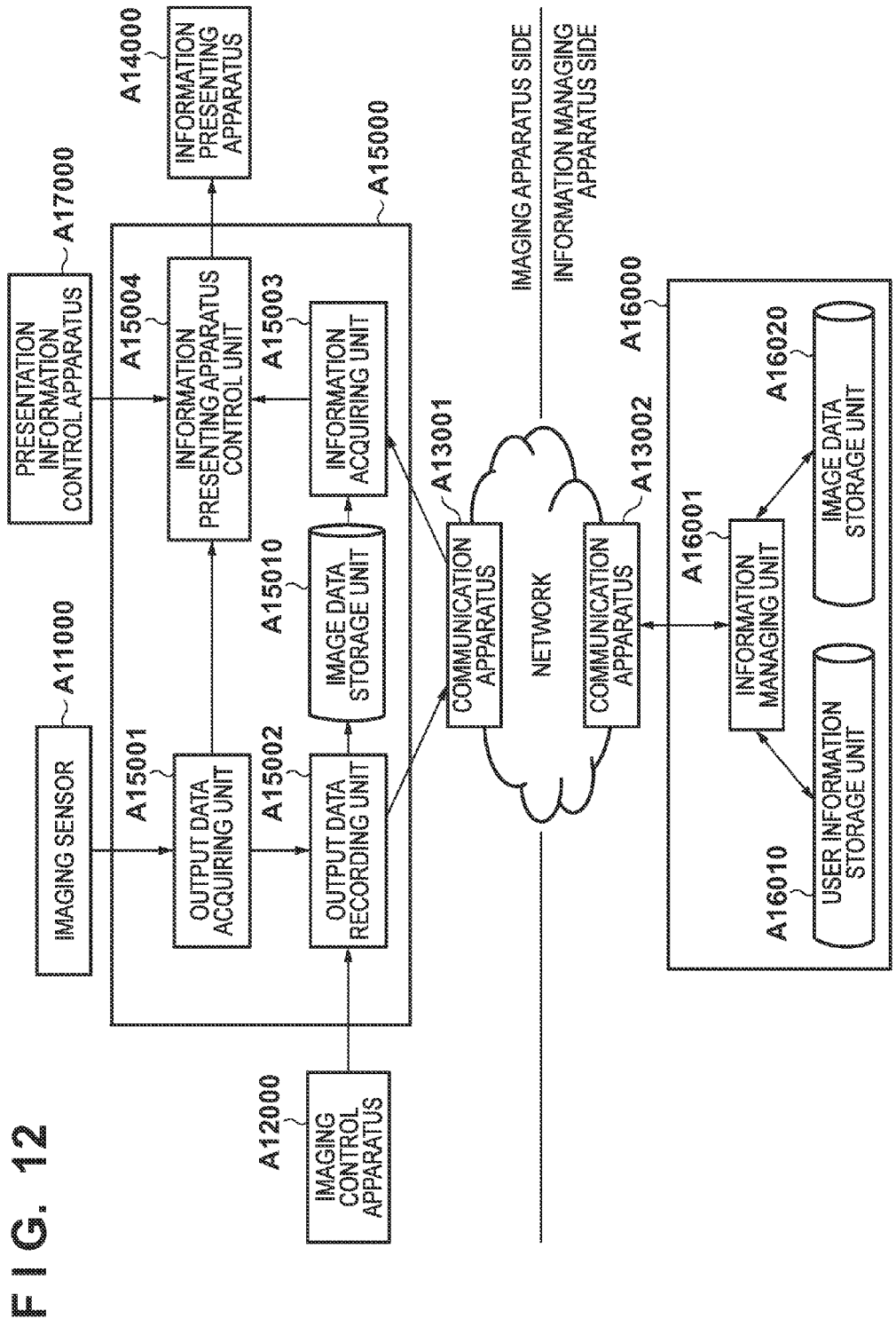
FIG. 12 is a view showing the overall arrangement and function of an imaging apparatus according to the second embodiment.

FIG. 12 is a view showing the overall arrangement and function of the imaging apparatus according to this embodiment. The imaging apparatus in FIG. 12 is different from that in FIG. 1 described in the first embodiment in the presence/absence of an image data storage unit A15010. As another difference, the image data storage unit A15010 is added as the output destination of image data in an output data recording unit A15002 and the acquisition destination of information in an information acquiring unit A15003. As still another difference, in accordance with an instruction from a presentation information control apparatus A17000, an information presenting apparatus control unit A15004 controls an information presenting apparatus A14000 to change the contents of information to be presented.

The output data recording unit A15002 is the same as that in the first embodiment except that it transmits acquired output data to the image data storage unit A15010 and an image data storage unit A16020. The information acquiring unit A15003 is the same as that in the first embodiment except that it acquires image data and the like from the image data storage unit A15010 and the image data storage unit A16020. The information presenting apparatus control unit A15004 is the same as that in the first embodiment except that information to be presented on the information presenting apparatus A14000 is changed in accordance with an instruction from the presentation information control apparatus A17000. The image data storage unit A15010 stores output data acquired from the output data recording unit A15002 as image data of a JPEG image or the like, and outputs it in response to a request from the information acquiring unit A15003. The presentation information control apparatus A17000 selects information to be presented, and instructs the information presenting apparatus control unit A15004 about it, thereby switching whether to display a live view image, whether to display image data of other users, and the like on the information presenting apparatus A14000. The remaining arrangement is the same as that in FIG. 1 described in the first embodiment.

(Practical Arrangement)

Figure 13:
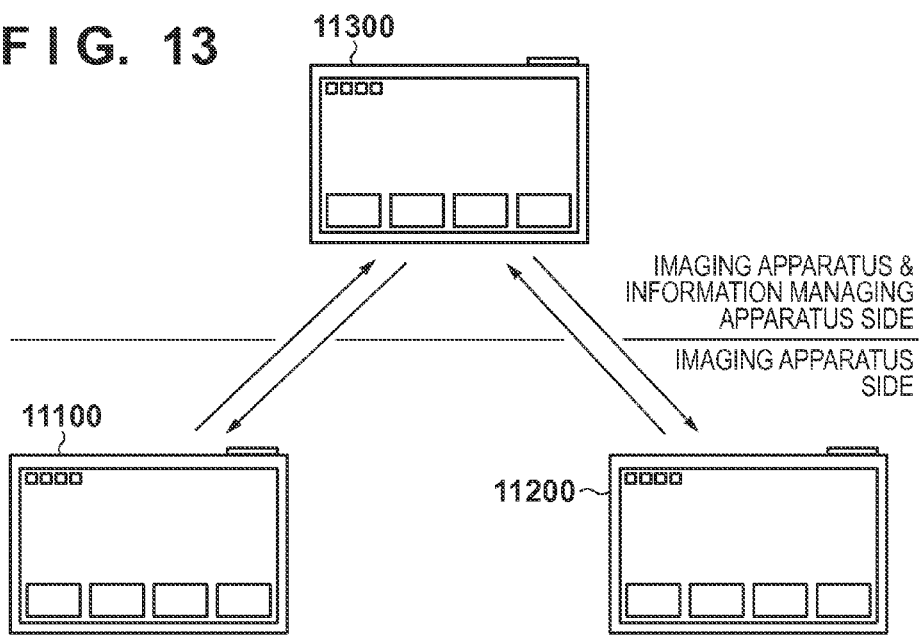
FIG. 13 is a view showing a practical arrangement in the second embodiment.

FIG. 13 shows a practical arrangement in the second embodiment. Each of cameras (imaging apparatuses) 11100 and 11200 includes an imaging sensor A11000, an imaging control apparatus A12000, a communication apparatus A13001, the information presenting apparatus A14000, a first calculating unit A15000, and the presentation information control apparatus A17000. A camera (imaging apparatus & information managing apparatus) 11300 includes a communication apparatus A13002 and a second calculating unit A16000, in addition to the apparatuses included in each of the cameras 11100 and 11200.

When a user presses a button equivalent to the internal imaging control apparatus A12000 in each of the cameras 11100 to 11300, the output data acquiring unit A15001 acquires an output from a CMOS image sensor equivalent to the imaging sensor A11000. The acquired data is recorded as image data of a JPEG image or the like in the image data storage unit A15010. The image data is sent to the camera 11300 via a wireless LAN communication module, a wireless LAN router, and communication equipment such as an Internet line that are equivalent to the communication apparatus A13001. The information presenting apparatus A14000 superimposes and displays a live view image acquired from the imaging sensor A11000, and information acquired from the image data storage unit A15010 and the camera 11300 in accordance with an input from the presentation information control apparatus A17000.

The first calculating unit A15000 has a program for executing the functions of the output data acquiring unit A15001, output data recording unit A15002, information acquiring unit A15003, and information presenting apparatus control unit A15004. The first calculating unit A15000 includes a memory usable as the image data storage unit A15010. The second calculating unit A16000 has a program for executing the function of an information managing unit A16001. The second calculating unit A16000 also includes a memory usable as a user information storage unit A16010 and the image data storage unit A16020. The practical arrangement in this embodiment has been described.

(Practical Processing Example)

Figure 16:
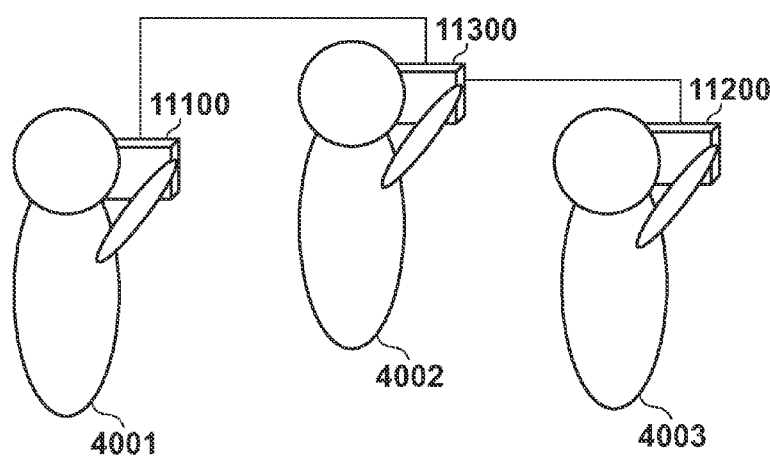
FIG. 16 is a view showing a use scene assumed in the second embodiment.

A practical example in this embodiment will be explained below with reference to the accompanying drawings. FIG. 16 shows a use scene assumed in this embodiment. This embodiment assumes that users 4001, 4002, and 4003 perform imaging with the hand-held cameras 11100, 11200, and 11300, respectively, as shown in FIG. 16. Each of the cameras 11100 and 11200 transmits image data obtained by the user to the information managing unit A16001 of the camera 11300, and receives image data obtained by users constituting a group, and user information. Assume that the users 4001 to 4003 belong to the same imaging group, and this group has already been set in advance in the user information storage unit A16010 of the camera 11300.

Figure 17:
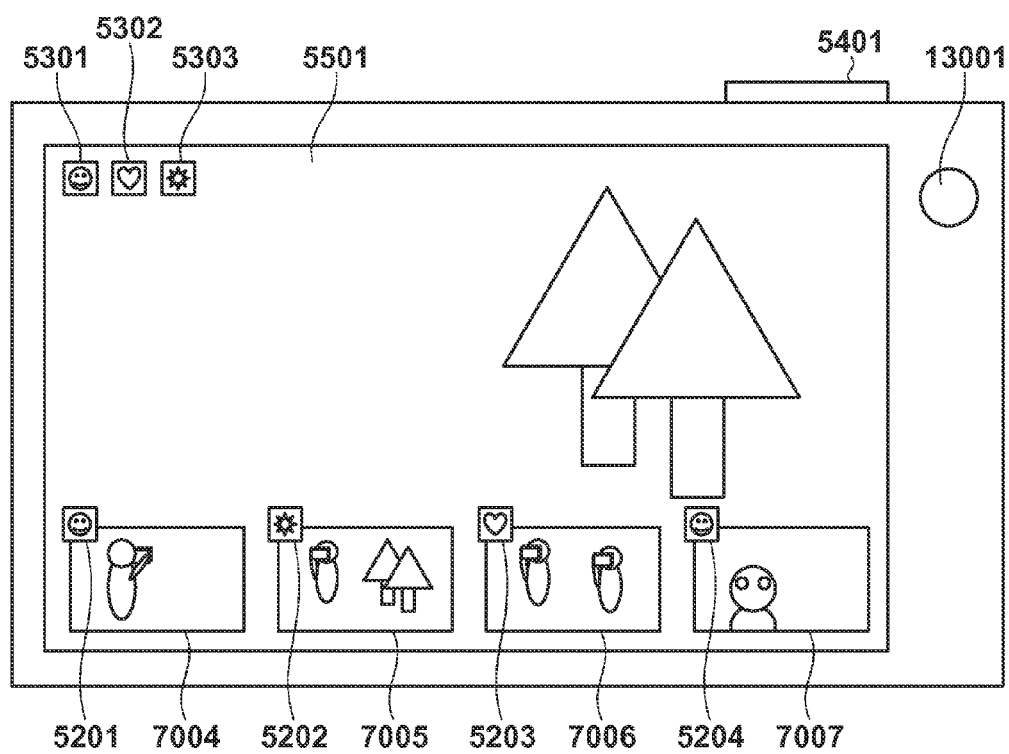
FIG. 17 is a view showing an example of a display on the rear surface of a camera 11100 in the second embodiment.

FIG. 17 shows a state of the camera 11100 of the user 4001 in this embodiment when viewed from the rear surface (view finder). The camera 11100 is different from the camera 2100 in the first embodiment in the presence/absence of a button 130001 equivalent to the presentation information control apparatus A17000. The presentation information control apparatus A17000 will be described later.

Figure 14:
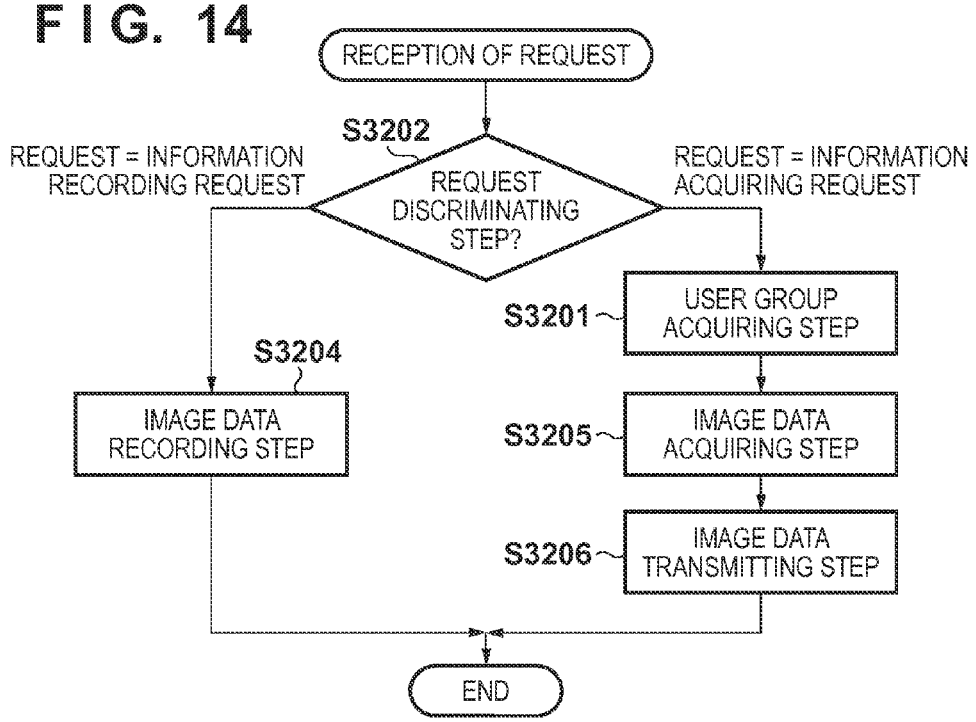
FIG. 14 is a flowchart showing the processing sequence of an information managing apparatus in the second embodiment.

Next, the processing sequences of the camera (imaging apparatus) 11100 and camera (imaging apparatus & information managing apparatus) 11300 when the user 4001 performs imaging by using the camera 11100 will be explained with reference to FIGS. 3 and 14. FIG. 3 is a flowchart showing the processing sequence of the camera 11100. FIG. 14 is a flowchart showing the processing sequence of the camera 11300. In FIG. 3, imaging sensor output data acquiring step S3101 and imaging determination step S3102 are the same as those in the first embodiment, and a description thereof will not be repeated. However, the camera 2100 in the first embodiment is equivalent to the camera 11100 in the second embodiment.

Figure 15:
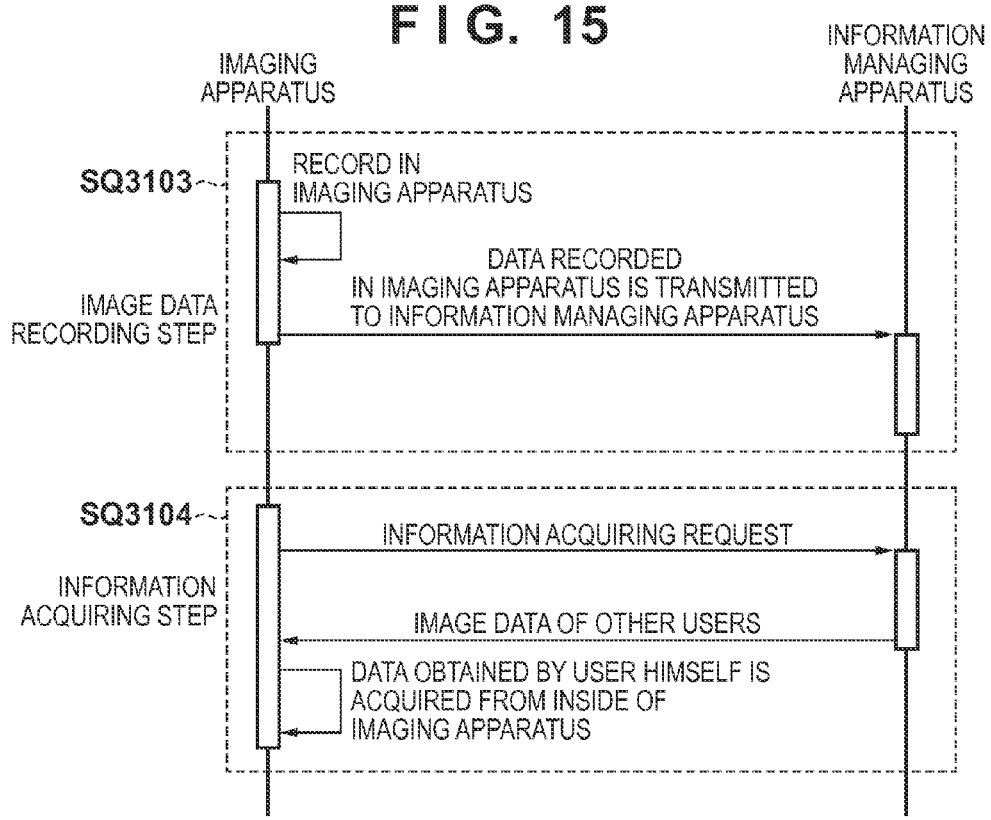
FIG. 15 is a chart showing a communication sequence in the second embodiment.

In image data recording step S3103 of FIG. 3, image data is recorded in the camera 11100, and the recorded image data is transmitted to the camera 11300. FIG. 15 shows a communication sequence in this embodiment. The communication sequence in image data recording step S3103 is shown in SQ3103 of FIG. 15. In image data recording step S3103, first, the output data recording unit A15002 records, as image data of a JPEG image in the image data storage unit A15010, an output from the imaging sensor A11000 that has been output from the output data acquiring unit A15001. When recording the image data in the image data storage unit A15010, the output data recording unit A15002 adds a user ID and the imaging time. Also, the image data storage unit A15010 adds an image data ID and a group ID to the image data to be recorded. After the image data having the user ID and the imaging time is recorded in the image data storage unit A15010, the output data recording unit A15002 transmits the same data as the recorded data to the camera 11300 via the communication apparatus A13001. In this case, image data 6000 shown in FIG. 8 is recorded as a JPEG image. Note that image data need not be a JPEG image, and may be Bitmap or RAW data.

FIG. 18 shows an example of information stored in the image data storage unit A15010. The table shown in FIG. 18 includes the image data ID, user ID, imaging time, image data, and group ID. Note that the user ID may be replaced with another. For example, an imaging apparatus-specific ID may be sent as long as an imaging apparatus and the user of the imaging apparatus can be linked and identified by any method. The group ID may be stored in advance in the image data storage unit A15010, or the image data storage unit A15010 may select and add a group ID in every imaging. As a matter of course, the group ID may be acquired from the outside. Further, the image data storage unit A15010 manages information by using a table in this embodiment, but another method such as text data, JSON, or CSV is available as long as information can be managed.

The image data storage unit A15010 generates image data IDs in the order of imaging by the camera 11100, and adds them to image data. In this embodiment, the user ID "4001" is embedded in image data IDs, like image data IDs 4001001, 4001002, and 4001003 in FIG. 18, so as to prevent addition of the same user ID to image data obtained by another imaging apparatus. In this embodiment, the image data storage unit A15010 generates image data IDs in the order in which image data have been received, and adds the image data IDs to the image data. However, the image data ID generation means is arbitrary, and the hash of image data or another ID capable of identifying image data is available. The format of the image data ID is not limited to a numeral. The image data storage unit A15010 may record information about a group to which a user belongs, and the like in the same table in addition to the image data ID, image data, user ID, and imaging date & time. The image data storage unit A15010 may record information such as the user ID and the imaging date & time in different tables. The design of the table for storing information is not particularly limited.

When the information managing unit A16001 of the camera 11300 receives image data from the output data recording unit A15002 via the communication apparatus A13002, the camera 11300 executes processing complying with the processing sequence shown in FIG. 14. In FIG. 14, request discriminating step S3202 is the same as that in FIG. 4 according to the first embodiment, and a description thereof will not be repeated. In image data recording step S3204, the image data storage unit A16020 combines information sent from the respective imaging apparatuses, and records them in one table. FIG. 19 shows an example of information stored in the image data storage unit A16020. Note that information recorded in the image data storage unit A16020 is not limited to one shown in FIG. 19, and other information about imaging may be recorded. The image data storage unit A16020 may record information such as the user and the imaging date & time in different tables. The design of the table for storing information is not particularly limited. Also, information is managed by using the table in this embodiment, but another description format such as text data, JSON, or CSV is available as long as information can be managed.

This embodiment assumes the network configuration as shown in FIG. 13, the cameras 11100 and 11200 are the imaging apparatuses, and the camera 11300 functions as both the imaging apparatus and the information managing apparatus. Each of the cameras 11100 and 11200 sends image data to the camera 11300. Alternatively, the cameras may communicate with each other and function as servers for the other cameras, or one of the cameras may serve as a parent and function as a server. As a communication means to the apparatus functioning as the server, the imaging apparatus may be directly connected to a public line such as 3G or LTE, or connected to the Internet by using a mobile Wi-Fi router. The server need not always reside on the Internet. Instead, the server may be built in a local area network and accessed by using a wireless LAN or the like. The location of the server and the access means are not limited. Needless to say, the type of network connection means such as wireless or wired connection is not limited.

Referring back to FIG. 3, information acquiring step S3104 is the same as that in the first embodiment except that the information acquiring unit A15003 acquires information from two locations. Note that the sequence in information acquiring step S3104 is shown in SQ3104 of FIG. 15. In information acquiring step S3104, first, the information acquiring unit A15003 makes a query (information acquiring request) to the information managing unit A16001 via the communication apparatus A13001. Then, the information acquiring unit A15003 acquires information about the users 4001, 4002, and 4003 constituting the same group as that of the user 4001, and image data obtained by the users 4002 and 4003. The second embodiment is different from the first embodiment in that image data obtained by the user 4001 is acquired not from the information managing unit A16001 but from the image data storage unit A15010.

Note that the image data acquisition method is not limited to a specific method. For example, first, the information acquiring unit A15003 acquires a list of image data obtained by the users 4001, 4002, and 4003 from the image data storage unit A16020. Then, the information acquiring unit A15003 acquires image data obtained by the user 4001 from the image data storage unit A15010, and acquires image data obtained by the users 4002 and 4003 from the image data storage unit A16020.

Information presenting step S3105 is the same as that in the first embodiment except that information to be acquired is set in accordance with an input from the presentation information control apparatus A17000. For example, in this embodiment, the presentation information control apparatus A17000 is a binary (ON/OFF) switch. By utilizing this, switching between display and non-display of information about the user and image data is designated.

FIG. 20 shows an example of a view finder screen when the switch of the presentation information control apparatus A17000 is ON. FIG. 21 shows an example of a view finder screen when the switch is OFF. When the switch is ON, the information presenting apparatus A14000 presents the icons of users constituting the same group as that of the user, image data obtained by the users constituting the same group, and the like, as shown in FIG. 20. However, when the switch is OFF, the information presenting apparatus A14000 presents none of the icons of users constituting the same group as that of the user, image data obtained by the users constituting the same group, and the like, as shown in FIG. 21. With this setting, an environment in which the user can concentrate on imaging can be provided.

In FIG. 21, when the switch of the presentation information control apparatus A17000 is OFF, the information presenting apparatus A14000 displays neither information about a user nor image data. However, even when the switch of the presentation information control apparatus A17000 is OFF, the information presenting apparatus control unit A15004 may select and acquire only some information from the information acquiring unit A15003. As the switch of the presentation information control apparatus A17000, an input device capable of setting not ON/OFF but a plurality of values may be used. For example, when a user operates such an input device, the information presenting apparatus control unit A15004 can acquire only image data obtained in the past from the information acquiring unit A15003, or acquire only image data obtained by the user himself. The presentation information control apparatus A17000 need not always be a binary switch, and may perform processing other than display/non-display of information. For example, the presentation information control apparatus A17000 may use a dial, a lever, a touch panel, or the like, and information to be presented may be changed in accordance with the situation, as a matter of course. Further, when the user touches image data by using the touch panel, the information presenting apparatus A14000 may perform processing of enlarging and displaying this image data.

As described above, according to this embodiment, one of imaging apparatuses functions as an information managing apparatus. Image data obtained by an imaging apparatus is transmitted to the information managing apparatus and is also stored in the internal memory of the imaging apparatus. The imaging apparatus acquires image data obtained by the user of this imaging apparatus from the internal memory of the imaging apparatus. Also, the imaging apparatus acquires, from the information managing apparatus, image data obtained by other users constituting a group, and information about the other users constituting the group. The imaging apparatus superimposes and displays the acquired information on the view finder screen of the imaging apparatus. When image data of the other users constituting the group are presented to the user of the imaging apparatus, the information acquisition destination is changed depending on the type of information so that information presented on the view finder screen can be easily changed. This can provide an imaging experience conformable to the user. Since the contents of photographs being taken in the group can be easily grasped, photographs beneficial to users, objects, and persons concerned can be taken efficiently.

According to this embodiment, images obtained by other users are presented to the user of an imaging apparatus on the view finder screen on which a live view image is displayed. This makes it possible to efficiently take photographs appreciated by objects, users, and persons concerned. By storing images obtained by the user himself in the camera, image data of the stored photographs need not be acquired via a network. Hence, image data can be presented in real time, providing a highly realistic sensation to the user. Note that the imaging apparatus in this embodiment is a hand-held camera, but the imaging apparatus to which this embodiment is applied is not limited. That is, the imaging apparatus to which this embodiment is applied may be a smartphone application. The view finder (information presenting apparatus A14000) and the imaging sensor (imaging sensor A11000) may be physically separated, as in a camera that performs remote control. The camera size, shape, method, and the like are not particularly limited. Needless to say, objects, scenes, and the like are not particularly limited.

Third Embodiment

The third embodiment of the present invention will be described below with reference to the accompanying drawings. The third embodiment is different from the first and second embodiments mainly in that respective imaging apparatuses manage information about image data, communicate with each other, and output the states of the imaging apparatuses. The third embodiment is also different in that a presentation information control apparatus A17000 issues an instruction not to an information presenting apparatus control unit A15004 but to an information acquiring unit A15003.

(Overall Arrangement View and Function)

Figure 22:
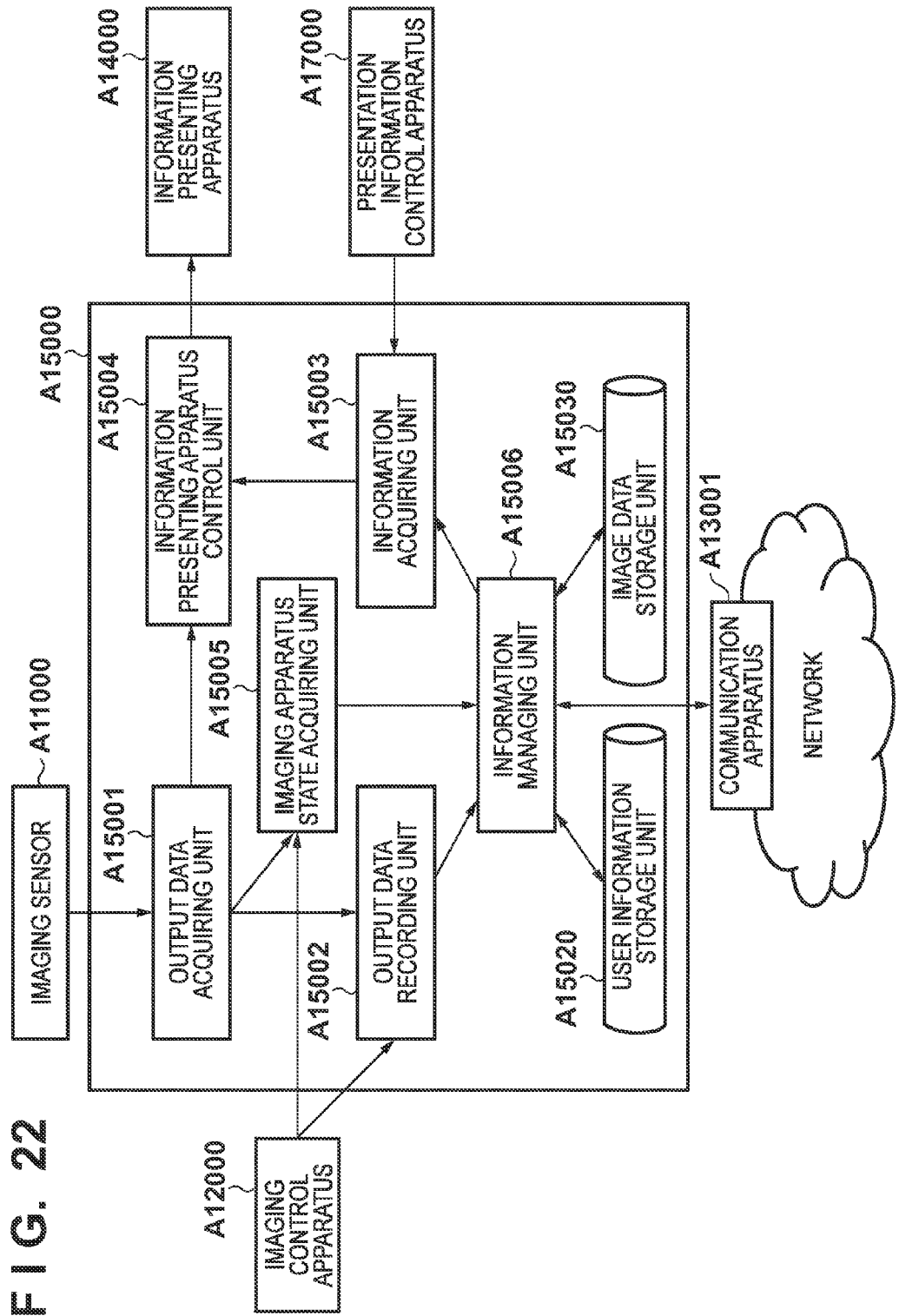
FIG. 22 is a view showing the overall arrangement and function of an imaging apparatus according to the third embodiment.

FIG. 22 is a view showing the overall arrangement and function of the imaging apparatus according to this embodiment. An imaging control apparatus A12000 is the same as that in the first embodiment except that the state of the imaging control apparatus A12000 is output to an imaging apparatus state acquiring unit A15005. A communication apparatus A13001 is the same as that in the first embodiment except that an information managing unit A15006 uses the communication apparatus A13001 to synchronize the contents of a user information storage unit A15020 and those of an image data storage unit A15030 with those in other imaging apparatuses.

An output data acquiring unit A15001 acquires and outputs an output from an imaging sensor A11000 in response to requests from an output data recording unit A15002, the information presenting apparatus control unit A15004, and the imaging apparatus state acquiring unit A15005. The imaging apparatus state acquiring unit A15005 acquires an imaging sensor state output from the output data acquiring unit A15001 and the state of the imaging control apparatus A12000, and records them in the user information storage unit A15020 by using the information managing unit A15006. In accordance with an input from the presentation information control apparatus A17000, the information acquiring unit A15003 accesses the information managing unit A15006, and acquires information about users constituting the same group as that of the user and about the state of the imaging apparatus, which are stored in the user information storage unit A15020. Also, the information acquiring unit A15003 acquires information about image data stored in the image data storage unit A15030.

The information presenting apparatus control unit A15004 is the same as that in the first embodiment except that it controls an information presenting apparatus A14000 to present information about the state of the imaging apparatus that is acquired from the information acquiring unit A15003, in addition to a live view image, information about the user, and image data. The information managing unit A15006 stores information about the user by using the user information storage unit A15020 and information about image data by using the image data storage unit A15030, and outputs them in response to a request from the information acquiring unit A15003. The information managing unit A15006 synchronizes the contents of the user information storage unit A15020 and image data storage unit A15030 with other imaging apparatuses via the communication apparatus A13001. The user information storage unit A15020 is the same as the user information storage unit A16010 in the first embodiment except that the user information storage unit A15020 stores the operating state of the imaging apparatus used by the user, in addition to the user ID, user icon, and user group. The image data storage unit A15030 is the same as the image data storage unit A16020 in the first embodiment. The presentation information control apparatus A17000 instructs the information acquiring unit A15003 about information to be presented, thereby switching whether to display a live view image, whether to display image data of other users, and the like. The remaining arrangement is the same as that in FIG. 1 described in the first embodiment.

(Practical Arrangement)

Figure 23:
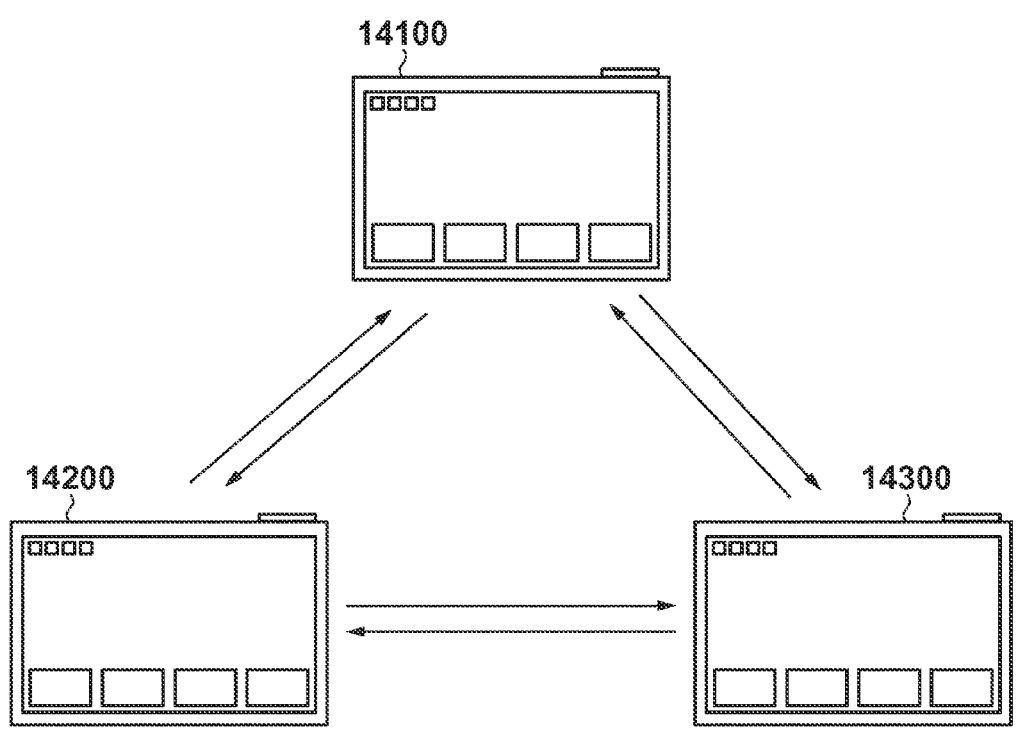
FIG. 23 is a view showing a practical arrangement in the third embodiment.

FIG. 23 shows a practical arrangement in the third embodiment. Each of cameras (imaging apparatuses) 14100 to 14300 includes the imaging sensor A11000, the imaging control apparatus A12000, the communication apparatus A13001, the information presenting apparatus A14000, the presentation information control apparatus A17000, and a calculating unit A15000. When a user presses a button equivalent to the imaging control apparatus A12000 in each of the cameras 14100 to 14300, the output data acquiring unit A15001 records an output from a CMOS image sensor equivalent to the imaging sensor A11000 in the output data recording unit A15002. The information managing unit A15006 exchanges, between the imaging apparatuses by using a wireless LAN communication module and wireless LAN router equivalent to the communication apparatus A13001, user information, the state of the imaging apparatus, and image data that are recorded in the output data recording unit A15002. In accordance with an input from the presentation information control apparatus A17000, the information presenting apparatus A14000 superimposes and displays, on a display unit, a live view image acquired from the imaging sensor A11000, and information acquired from the information managing unit A15006.

The calculating unit A15000 has a program for executing the functions of the output data acquiring unit A15001, output data recording unit A15002, information acquiring unit A15003, information presenting apparatus control unit A15004, imaging apparatus state acquiring unit A15005, and information managing unit A15006. The calculating unit A15000 includes a memory usable as the user information storage unit A15020 and the image data storage unit A15030. The practical arrangement in this embodiment has been described.

(Practical Processing Example)

Figure 26:
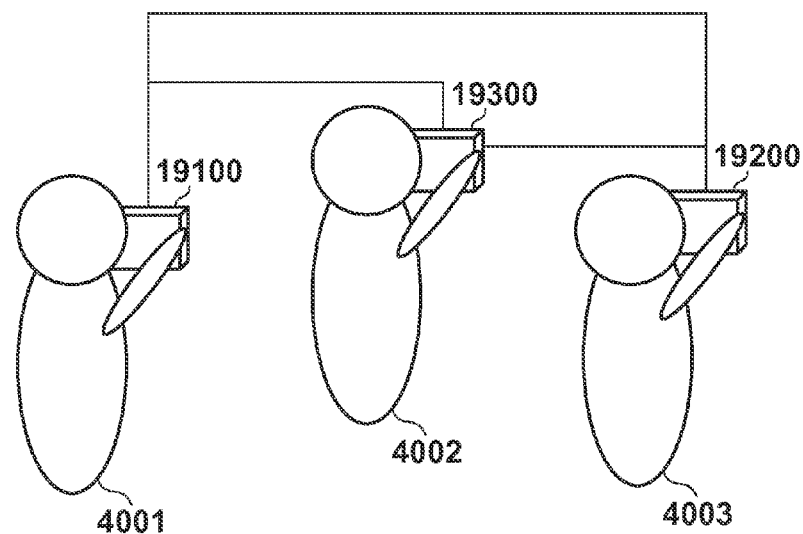
FIG. 26 is a view showing a use scene assumed in the third embodiment.
Figures 27, 28:
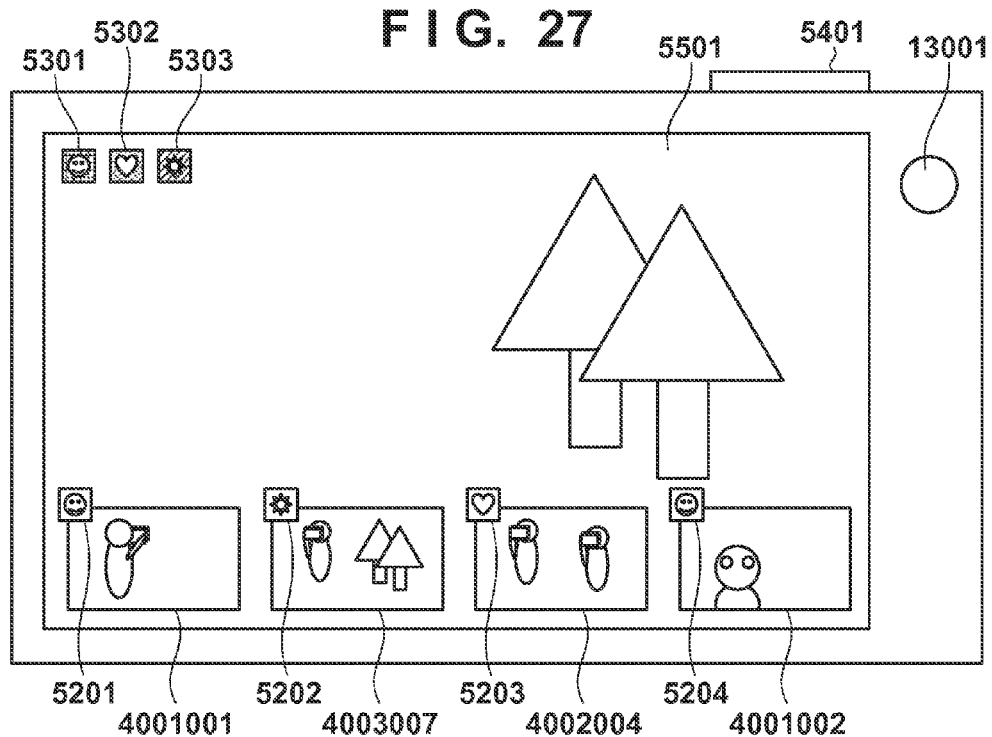
FIG. 27 is a view showing an example of a display on the rear surface of a camera 19100 in the third embodiment.
FIG. 28 is a table showing an example of information stored in a user information storage unit A15020 in the third embodiment.

A practical processing example in this embodiment will be explained below with reference to the accompanying drawings. FIG. 26 shows a use scene assumed in this embodiment. This embodiment assumes that when there are users 4001, 4002, and 4003, they perform imaging with hand-held cameras 19100, 19200, and 19300, respectively, as shown in FIG. 26. Assume that the users 4001 to 4003 have already been set in advance as the same group, and know the network addresses of the other imaging apparatus. FIG. 27 shows a display example of the rear surface (view finder screen) of the camera 19100 of the user 4001. Image data 4001001, 4003007, 4002004, and 4001002 respectively obtained by the cameras 19100 to 19300 are displayed on a view finder screen 5501 of the camera 19100 of the user 4001 in the imaging time order. Hence, images obtained by the other users constituting the group can be easily confirmed during imaging. Photographs beneficial to the users 4001 to 4003 can be taken efficiently.

Figure 24:
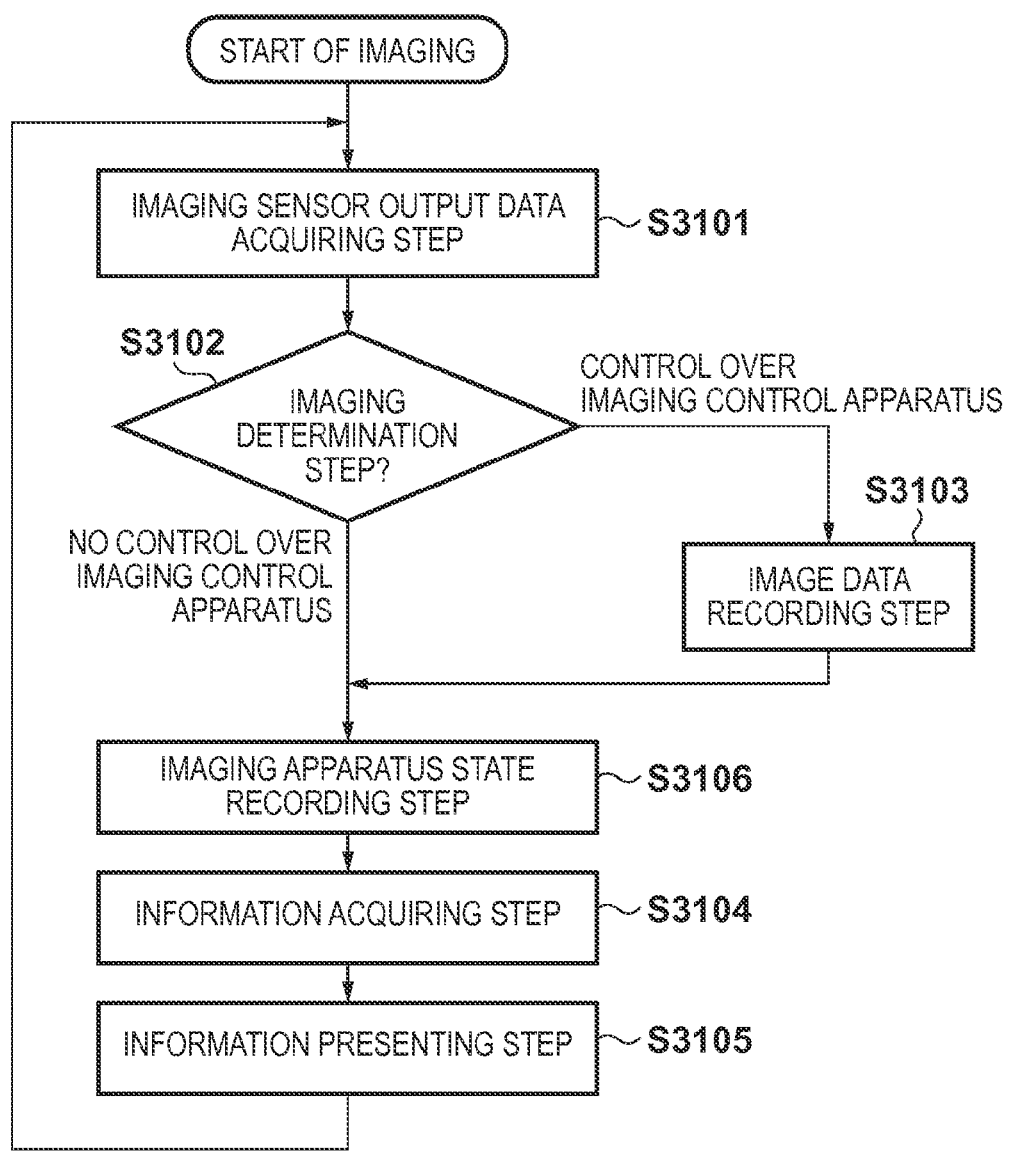
FIG. 24 is a flowchart showing a processing sequence in the third embodiment.

The processing sequence of the camera (imaging apparatus) 19100 when the user 4001 performs imaging by using the camera 19100 will be described with reference to FIG. 24. FIG. 24 is a flowchart showing the processing sequence of the camera 19100. In FIG. 24, imaging sensor output data acquiring step S3101 and imaging determination step S3102 are the same as those in the first embodiment, and a description thereof will not be repeated. However, the camera 2100 in the first embodiment is equivalent to the camera 19100 in the third embodiment.

Figure 25:
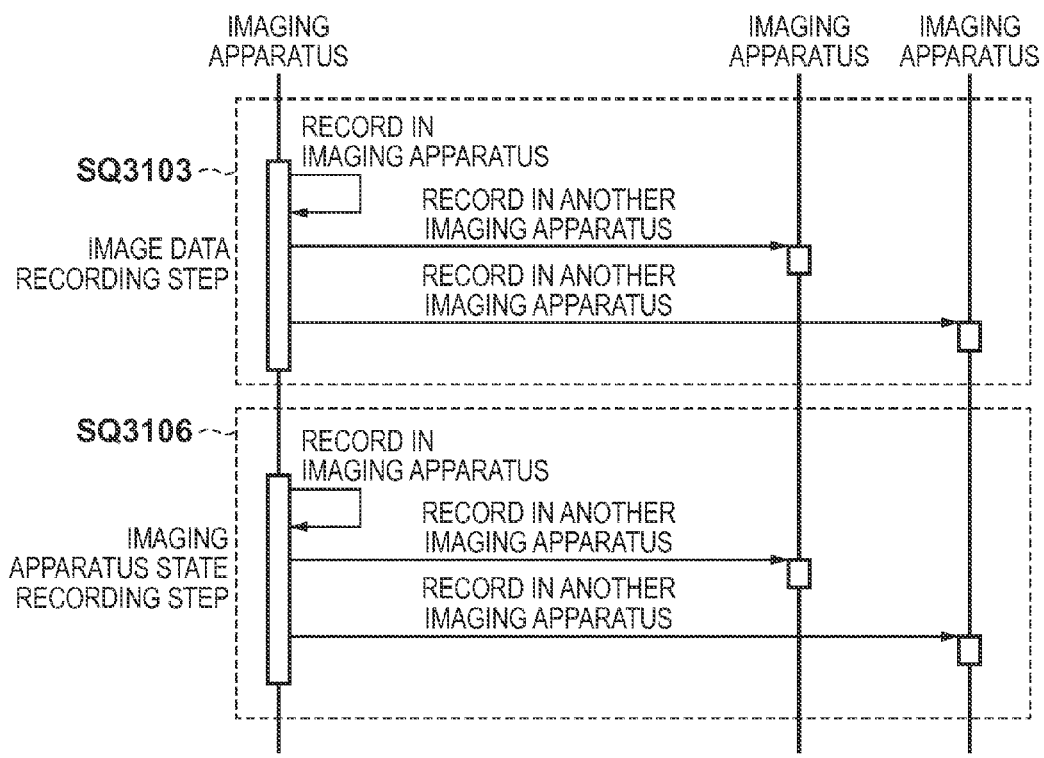
FIG. 25 is a chart showing a communication sequence in the third embodiment.

Image data recording step S3103 is the same as that in the first embodiment except that image data is recorded in the image data storage unit A15030 by using the information managing unit A15006, instead of recording image data via the communication apparatus A13001. FIG. 25 shows a communication sequence in this embodiment. The sequence in image data recording step S3103 is shown in SQ3103 of FIG. 25. Processing by the information managing unit A15006 in image data recording step S3103 is the same as processing by the information managing unit A16001 described in the first embodiment. However, the image data storage unit A16020 is equivalent to the image data storage unit A15030. FIG. 19 shows an example of information stored in the image data storage unit A15030. The information managing unit A15006 generates and adds an image data ID, and records a user ID, imaging time, group ID, and image data in the image data storage unit A15030. After recording the image data in the image data storage unit A15030, the information managing unit A15006 sends the image data to the cameras 19200 and 19300 via the communication apparatus A13001.

Upon receiving the image data from the imaging apparatus 19100 via the communication apparatus A13001, each of the cameras 19200 and 19300 records the image data in the image data storage unit A15030 by using the information managing unit A15006 incorporated in each of the imaging apparatuses 19200 and 19300. In this embodiment, at the time of recording image data, image data to be recorded in the other imaging apparatuses is transmitted to synchronize the contents of the image data storage unit A15030. However, the synchronization may be tried at another timing by, for example, a method of performing synchronization at regular intervals. In this embodiment, as the synchronization method, the difference of the stored contents of the image data storage unit A15030 is detected between a plurality of imaging apparatuses. If there is a difference, the difference is requested of an imaging apparatus storing the difference, and the received difference is recorded. However, the synchronization method is not limited and is arbitrary as long as the stored contents of the image data storage units A15030 of the respective imaging apparatuses periodically become the same. Also, the synchronization may be performed at a timing when data was changed, or at regular intervals. The timing is not limited, as a matter of course.

In imaging apparatus state recording step S3106, the imaging apparatus state acquiring unit A15005 outputs the state of the imaging apparatus to the information managing unit A15006, and the information managing unit A15006 stores it in the user information storage unit A15020. Note that the sequence in imaging apparatus state recording step S3106 is shown in SQ3106 of FIG. 25. FIG. 28 shows an example of information stored in the user information storage unit A15020 in this embodiment. The user ID and icon of each user, the state of his imaging apparatus, and a group to which the user belongs are recorded. Conceivable examples of the state of the imaging apparatus are the operating state, the imaging state, the tilt of the imaging apparatus, the power state of the imaging apparatus, and the state of the imaging control apparatus of the imaging apparatus. Needless to say, the state of the imaging apparatus is not limited to them. When the imaging apparatus state information is updated, the information managing unit A15006 transmits the information to the other imaging apparatuses to prevent generation of a contradiction between the contents of the user information storage units A15020 in the respective imaging apparatuses constituting the group. Note that the synchronization method is the same as that in image data recording step S3103, and is not particularly limited.

Information acquiring step S3104 is the same as that in the first embodiment. However, the user information contains the operating state of the imaging apparatus of the user, in addition to the user ID, the user icon, and the group to which the user belongs. Data is acquired from the image data storage unit A15030 and the user information storage unit A15020 by using the information managing unit A15006, instead of recording image data via the communication apparatus A13001. Further, information to be acquired is set in accordance with an input from the presentation information control apparatus A17000. In this embodiment, the presentation information control apparatus A17000 is a switch capable of setting the ON/OFF state. When the set value is OFF, it is set not to acquire information. Even in the OFF state, however, only some information may be acquired. Alternatively, an input device capable of setting not ON/OFF but a plurality of values may be used. For example, when a user operates such an input device, the information acquiring unit A15003 can acquire only image data obtained in the past from the information managing unit A15006, or acquire only image data obtained by the user himself. In this embodiment, information acquisition processing by the information acquiring unit A15003 is executed in the processing sequence shown in FIG. 24. However, the information acquisition processing need not always be performed in every execution of this loop, and may be performed once in several times of execution or upon generation of any event.

Information presenting step S3105 is the same as that in the first embodiment. However, as shown in FIG. 29, information about the users 4001, 4002, and 4003 constituting the group are displayed by icons such as icons 5301, 5302, and 5303 at the upper left corner, and the icons are processed in accordance with the state of the imaging apparatus. More specifically, a filter shown in FIG. 30 is applied. FIG. 30 shows the table of the correspondence between the state of the imaging apparatus and the filter. For example, a filter 24001 is applied when the imaging apparatus is OFF, and a filter 24002 is applied when the imaging apparatus is in the playback mode. This represents that the image data can be viewed between the users 4001, 4002, and 4003 when the user 4001 performs imaging, and also represents the current states of the respective users. In this fashion, information about users constituting a group, and image data of the other users are superimposed and presented on a live view image. During an imaging action, each user can easily recognize the contents of photographs being taken by the other users. Even if the other users do not perform imaging, the user can recognize the operating states of their imaging apparatuses. The user can be provided with a higher realistic sensation.

As described above, images obtained by other users are presented on a live view image to the user of an imaging apparatus. Photographs appreciated by objects, users, and persons concerned can be taken efficiently. Note that the imaging apparatus in this embodiment is not limited to a hand-held camera, but may be a smartphone application. The view finder (information presenting apparatus A14000) and the imaging sensor (imaging sensor A11000) may be physically separated, as in a camera that performs remote control. The camera size, shape, method, and the like are not particularly limited. Needless to say, objects, scenes, and the like are not particularly limited.

As described above, according to this embodiment, respective imaging apparatuses function as information managing apparatuses, and store obtained image data and the states of the imaging apparatuses in the internal memories of the imaging apparatuses. Then, information stored in the respective imaging apparatuses are synchronized. Image data obtained by each user himself and the state of his imaging apparatus are transmitted to the other imaging apparatuses, and image data obtained by the other imaging apparatuses and the states of the other imaging apparatuses are received from the other imaging apparatuses. Each imaging apparatus acquires, from the information managing apparatuses in accordance with an instruction from the presentation information control apparatus, image data obtained by the other users constituting a group, the states of the other imaging apparatuses, and information about the other users constituting the group. The acquired information are superimposed and displayed on the view finder of the imaging apparatus. Not only image data but also the states of the imaging apparatuses are shared between the users constituting the group. Each user can grasp the states of the other users in more detail, and can easily grasp the contents of photographs being taken in the group. As a result, photographs beneficial to users, objects, and persons concerned can be taken efficiently.

Fourth Embodiment

The fourth embodiment of the present invention will be described below with reference to the accompanying drawings. The fourth embodiment is different from the first embodiment mainly in that the icons of other users constituting a group and the icons of the users displayed at the upper left corners of respective image data are different.

(Overall Arrangement View and Function)

The overall arrangement view and function in the fourth embodiment are the same as those in the first embodiment.

(Practical Arrangement)

The practical arrangement in the fourth embodiment is the same as that in the first embodiment.

(Practical Processing Example)

A practical processing example in the fourth embodiment is the same as that in the first embodiment except for a state of a camera 2100 of a user 4001 when viewed from the rear surface (view finder), and the contents of information presenting step S3105.

FIG. 31 shows a state of the camera 2100 of the user 4001 in this embodiment when viewed from the rear surface (view finder). The fourth embodiment is different from the first embodiment in the following points. That is, textures 31301 to 31303 different between users are superimposed on icons 5301 to 5303 of other users constituting a group that are displayed on a view finder screen 5501. Also, the textures 31301 to 31303 applied to the icons of the users are superimposed and displayed on image data 7004, 7005, 7006, and 7007 (31101 to 31104), respectively. FIG. 32 shows a table showing an example of the correspondence between a user ID and a texture.

Information presenting step S3105 in the fourth embodiment is the same as that in the first embodiment except for the following points. That is, the different textures 31301 to 31303 are assigned to respective users 4001 to 4003 acquired by an information acquiring unit A15003, as shown in FIG. 32. The textures 31301 to 31303, and the icons 5301 to 5303 serving as information about the users 4001 to 4003 constituting a group are superimposed and displayed at the upper left corner of the view finder screen 5501 (imaging confirmation screen) on which a live view image is displayed, as shown in FIG. 31. The textures corresponding to the respective users in the table of FIG. 32 are superimposed and displayed on the image data 7004 to 7007, as represented by 31101 to 31104.

When the sizes of the regions 31101 to 31104, which are superimposed and displayed on the respective image data 7004 to 7007 and display the users of respective image data, are small, even if the icons 5301 to 5303 of the users are displayed, these icons cannot be identified. Even in this case, the users can be specified by confirming the types of textures. Textures of different patterns are assigned to respective users in this embodiment, but the present invention is not limited to this. For example, different colors or tastes may be added to respective users, or the shapes of the icons may be changed. Any method is usable as long as each user can identify users. Even when the sizes of icons superimposed and displayed on image data are small, the icons 5301 to 5303 may be simply reduced and displayed, or the reduced icons may be combined with textures and then superimposed and displayed on image data, as a matter of course.

Fifth Embodiment

The fifth embodiment of the present invention will be described below with reference to the accompanying drawings. The fifth embodiment is different from the first embodiment mainly in that the icons of other users constituting a group and the way to indicate the users of respective image data are presented not as the icons of users displayed at the upper left corners of image data, but decorations to the image data.

(Overall Arrangement View and Function)

The overall arrangement view and function in the fifth embodiment are the same as those in the first embodiment.

(Practical Arrangement)

The practical arrangement in the fifth embodiment is the same as that in the first embodiment.

(Practical Processing Example)

A practical processing example in the fifth embodiment is the same as that in the first embodiment except for a state of a camera 2100 of a user 4001 when viewed from the rear surface (view finder), and the contents of information presenting step S3105.

Figure 33:
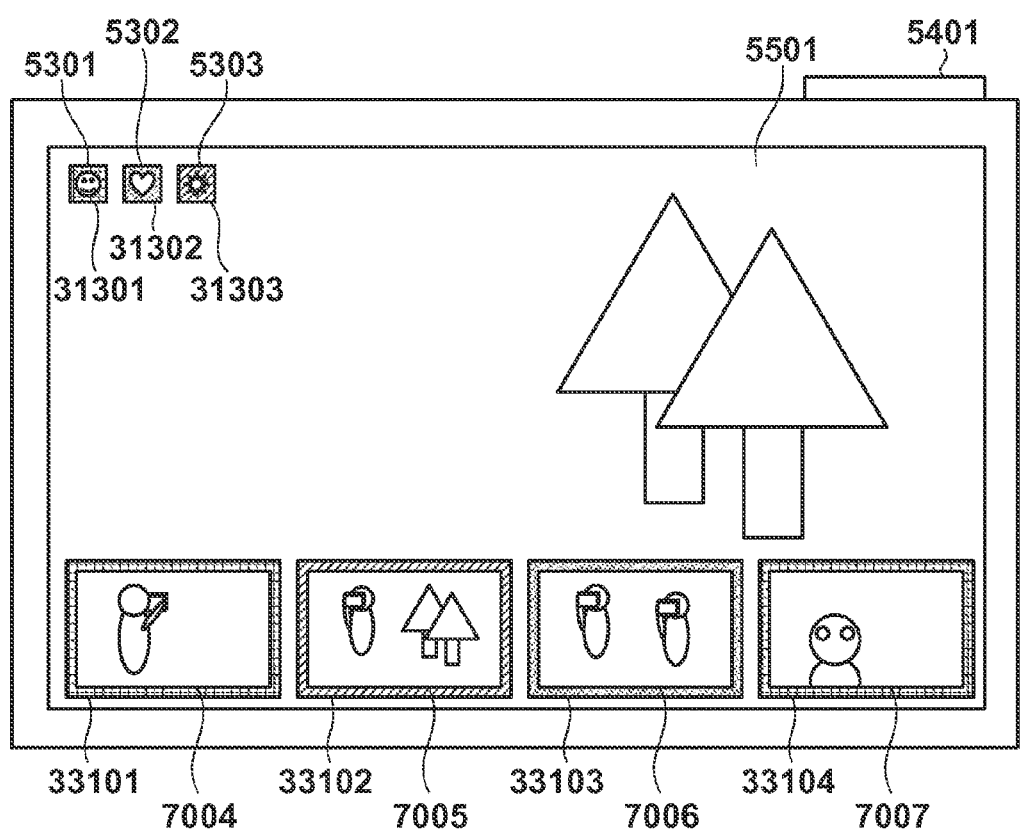
FIG. 33 is a view showing an example of a display on the rear surface of a camera 2100 in the fifth embodiment.

FIG. 33 shows a state of the camera 2100 of the user 4001 in this embodiment when viewed from the rear surface (view finder). The fifth embodiment is different from the first embodiment in the following points. That is, textures 31301 to 31303, which are different between users, are superimposed and displayed on icons 5301 to 5303 of other users constituting a group that are displayed on a view finder screen 5501. Also, frames 33101, 33102, 33103, and 33104 are displayed as decorations around image data 7004, 7005, 7006, and 7007, and the textures 31301 to 31303 superimposed on the icons of the users are superimposed and displayed on these frames.

Information presenting step S3105 in the fifth embodiment is the same as that in the first embodiment except for the following points. That is, the different textures 31301 to 31303 are assigned to respective users 4001 to 4003 acquired by an information acquiring unit A15003, as shown in FIG. 32. The textures 31301 to 31303 are superimposed on the icons 5301 to 5303 serving as information about the users 4001 to 4003 constituting a group, and are displayed at the upper left corner of the view finder screen 5501 (imaging confirmation screen) on which a live view image is displayed, as shown in FIG. 33. The textures corresponding to the respective users in the table of FIG. 32 are displayed on the frames 33101 to 33104 added as the decorations of the image data 7004 to 7007.

This obviates the need to superimpose image data and the icon of a user. Even if the icon cannot be displayed at an identifiable size under the limitation of the display space or the like, a user can be easily specified. Textures of different patterns are assigned to respective users in this embodiment, but the present invention is not limited to this. Different colors or tastes may be added to respective users. This embodiment uses a frame as the decoration method, but the thickness and shape of a frame, the type of line, and the like are not limited. As the decoration method, the shade, character, stamp, or the like may be added, various kinds of effects or filters may be applied, or the shape or the like may be changed. Any method is available as long as the user can identify the user of each photograph. Even when textures are superimposed and displayed on the frames of image data, they may be displayed together with the icons 5301 to 5303 of the users, as a matter of course.

The above-described embodiment has assumed that a group is constituted in advance. However, the grouping method is arbitrary, such as is in a method of manually setting a group, a method of semi-automatically setting a group, or a method of automatically setting a group. As for the layout and arrangement of the view finder screen, the presentation contents, the information presentation position, the information presentation size, and the like are not limited.

According to the embodiments above, each user in a group can take highly unique photographs different from those taken by other users. Further, this can reduce the possibility of an imaging miss arising from a prejudice that someone in the group is taking a photograph and the user himself need not take a photograph. Therefore, exhaustive photographs can be easily taken. Photographs beneficial to users constituting a group, objects, and the like can be taken efficiently.

Although the embodiments have been described in detail above, the present invention can take an embodiment as a system, apparatus, method, program, recording medium (storage medium), or the like. More specifically, the present invention may be applied to a system constituted by a plurality of devices (for example, a host computer, interface device, imaging apparatus, and Web application), or an apparatus formed from one device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-268087, filed Dec. 25, 2013 and No. 2014-226403, filed Nov. 6, 2014 which are hereby incorporated by reference herein in their entirety.

What is claimed is:

1. An imaging apparatus comprising:
an image capturing unit;
an acquiring unit configured to acquire, from an external apparatus, other image data obtained by other imaging apparatuses, and other image data information containing information about the other image data; and
a display control unit configured to arrange, in a first region of a display unit that displays an imaging confirmation screen to confirm image data obtained by the image capturing unit, the image data and the other image data in an order of an imaging date and an imaging time, and display, in a second region of the display unit, image data information indicating information about the image data and other image information indicating information about the image data of all other imaging apparatuses belonging to a same group as the imaging apparatus,
wherein the image data information comprises information indicating an identification of a photographer who is a user of the imaging apparatus, and the other image data information comprises information indicating an identification of other photographers who are users of the other imaging apparatuses.

2. The apparatus according to claim 1, further comprising a transmitting unit configured to transmit, to the external apparatus, the image data and the image data information.

3. The apparatus according to claim 2, wherein said display control unit superimposes the image data, the image data information, and the other image data information, on the display unit.

4. The apparatus according to claim 3, wherein the image data information and the other image data information displayed by said display control unit contain identification information representing affiliation to the same group.

5. The apparatus according to claim 1, further comprising a recording unit configured to record the image data and the image data information.

6. The apparatus according to claim 1, wherein the image data, the image data information, and the other image data information are recorded.

7. The apparatus according to claim 1, wherein the image data and the other image data displayed in the first region are displayed on the display unit to allow the user to recognize, from one or a combination of a character, an icon, an image, a color, a filter, a pattern, a frame, and a shape, the user and the other users who are displayed in the second region and have obtained the image data and the other image data displayed in the first region.

8. The apparatus according to claim 7, wherein
the image data information and the other image data information contain information about an operating state of the imaging apparatus and operating states of the other imaging apparatuses, respectively.

9. The apparatus according to claim 8, wherein said display control unit displays the operating state of the imaging apparatus and the operating states of the other imaging apparatuses on the display unit so as to allow the user to recognize the operating state of the imaging apparatus and the operating states of the other imaging apparatuses.

10. The apparatus according to claim 1, wherein said display control unit selects and displays, in accordance with an operation by the user, the image data information to be displayed on the display unit.

11. The apparatus according to claim 1, wherein said acquiring unit selects and acquires, in accordance with an operation by the user, the image data information to be displayed on the display unit.

12. The apparatus according to claim 1, wherein said display control unit switches, in accordance with an operation by the user, whether to display the image data information on the display unit.

13. The apparatus according to claim 1, wherein the external apparatus is one of the other imaging apparatuses.

14. The apparatus according to claim 1, wherein the external apparatus is a predetermined apparatus different from the other imaging apparatuses.

15. A method of controlling an imaging apparatus, the method comprising:
an image capturing step of obtaining image data from an image capturing unit;

an acquiring step of acquiring, from an external apparatus, other image data obtained by other imaging apparatuses, and other image data information containing information about the other image data; and a display control step of arranging, in a first region of a display unit that displays an imaging confirmation screen on a display unit to confirm image data obtained by the image capturing step, the image data and the other image data in an order of an imaging date and an imaging time;

a display control step of displaying, in a second region of the display unit, image data information indicating information about the image data and other image information indicating information about the image data of all other imaging apparatuses belonging to a same group as the imaging apparatus, wherein the image data information comprises information indicating an identification of a photographer who is a user of the imaging apparatus, and the other image data information comprises information indicating an identification of other photographers who are users of the other imaging apparatuses.

16. A non-transitory computer-readable storage medium storing a computer program for controlling a computer to execute a method comprising:

an image capturing step of obtaining image data from an image capturing unit;

an acquiring step of acquiring, from an external apparatus, other image data obtained by other imaging apparatuses, and other image data information containing information about the other image data; and a display control step of arranging, in a first region of a display unit that displays an imaging confirmation screen on a display unit to confirm image data obtained by the image capturing step, the image data and the other image data in an order of an imaging date and an imaging time;

a display control step of displaying, in a second region of the display unit, image data information indicating information about the image data and other image information indicating information about the image data of all other imaging apparatuses belonging to a same group as the imaging apparatus, wherein the image data information comprises information indicating an identification of a photographer who is a user of the imaging apparatus, and the other image data information comprises information indicating an identification of other photographers who are users of the other imaging apparatuses.

* * * * *